(12) United States Patent
Cohen et al.

(10) Patent No.: US 11,370,424 B1
(45) Date of Patent: Jun. 28, 2022

(54) RELEVANT OBJECT DETECTION

(71) Applicant: Zoox, Inc., Foster City, CA (US)

(72) Inventors: Joshua Kriser Cohen, Sunnyvale, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 294 days.

(21) Appl. No.: 16/530,515

(22) Filed: Aug. 2, 2019

(51) Int. Cl.
*B60W 30/095* (2012.01)
*B60W 30/09* (2012.01)
*G08G 1/16* (2006.01)
*G06V 20/58* (2022.01)

(52) U.S. Cl.
CPC ........ *B60W 30/0956* (2013.01); *B60W 30/09* (2013.01); *B60W 30/0953* (2013.01); *G06V 20/58* (2022.01); *G08G 1/166* (2013.01); *G08G 1/167* (2013.01); *B60W 2520/06* (2013.01); *B60W 2554/00* (2020.02); *B60W 2554/80* (2020.02)

(58) Field of Classification Search
CPC .............. B60W 30/09; B60W 30/095; B60W 30/0953; B60W 30/0956; B60W 2520/06; B60W 2554/00; B60W 2554/80; G06K 9/00805; G08G 1/166; G08G 1/167
See application file for complete search history.

(56) References Cited

U.S. PATENT DOCUMENTS

| | | | |
|---|---|---|---|
| 2007/0276600 A1* | 11/2007 | King | G08G 1/166 701/301 |
| 2009/0070039 A1* | 3/2009 | Beuschel | B60W 40/10 701/301 |
| 2017/0197616 A1* | 7/2017 | Ichikawa | B60T 7/22 |
| 2017/0372612 A1* | 12/2017 | Bai | G08G 1/161 |
| 2018/0148051 A1* | 5/2018 | Lujan | G05D 1/0214 |
| 2019/0004538 A1* | 1/2019 | Wood | B60W 60/001 |
| 2019/0193629 A1* | 6/2019 | Zevenbergen | B60Q 1/50 |
| 2019/0213886 A1* | 7/2019 | Noda | G08G 1/0125 |
| 2020/0055524 A1* | 2/2020 | Lacaze | G06K 9/6262 |
| 2020/0317119 A1* | 10/2020 | Huang | B60Q 1/50 |

* cited by examiner

*Primary Examiner* — Anshul Sood
(74) *Attorney, Agent, or Firm* — Lee & Hayes, P.C.

(57) ABSTRACT

A tool for providing vehicle perception system metrics associated with objects that are relevant to the vehicle is discussed herein. The tool may be configured with criteria for relevance. The criteria may include a region of interest proximate the vehicle, an object classification, an object characteristic and/or a sensor type. The tool may receive sensor data captured by a sensor of the vehicle and may be configured to identify relevant objects based on the criteria. The tool may filter and/or determine perception system metrics associated with the relevant objects. In some examples, the tool may identify the relevant objects and may cause the vehicle to be controlled based on the determination of object relevance.

20 Claims, 9 Drawing Sheets

RELEVANT OBJECT DETECTION

BACKGROUND

Autonomous and semi-autonomous vehicles make control decisions based in part on data captured by perception systems. A perception system associated with a vehicle may detect dynamic and static objects in an operating environment and provide perception data to a planner to determine actions for the vehicle. Due to limitations in computational resources, an overabundance of objects in an environment may preclude a system from properly functioning, whether it be safely and accurately accounting for all such objects when driving or when determining how well a particular system functions at performing a task related to such objects (e.g., as may be indicated by various metrics).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
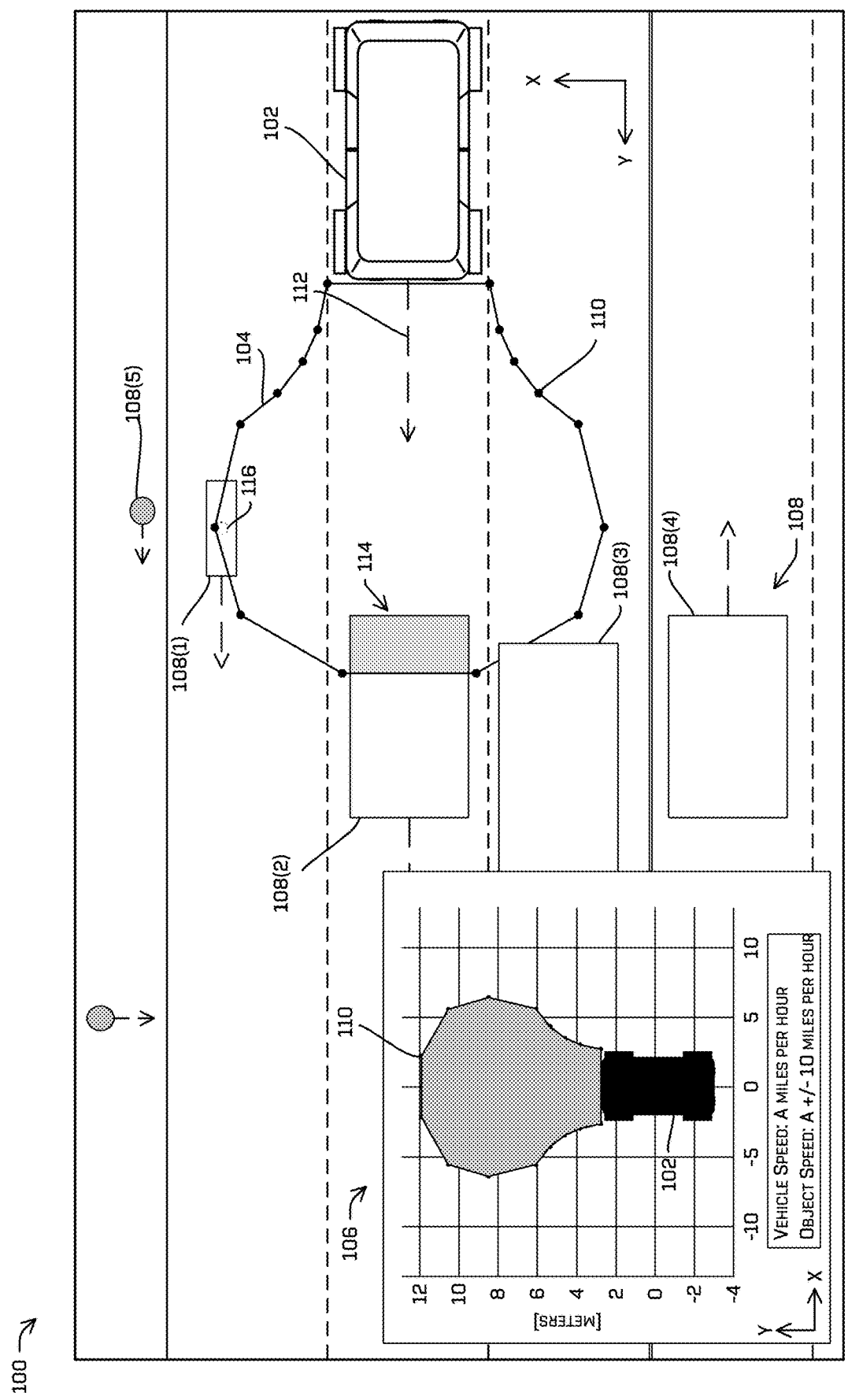
FIG. 1 is an illustration of an autonomous vehicle in an environment, wherein an example tool may be configured to limit various algorithms to a region of interest.

This disclosure is directed to a highly configurable tool for measuring performance of a perception system when used off-line, as well as limiting the amount of data used in such perception systems for increased performance when used on-line. The tool may be configured to determine performance metrics (e.g., perception system metrics) associated with the vehicle perception system within a defined region of interest. The region of interest may represent an area of relevance to the vehicle, outside of which the perception system may not need to track objects and/or compute performance metrics associated therewith. The performance metrics may correspond to an accuracy of the vehicle perception system to identify and track objects within the region of interest and/or objects with trajectories that may intersect the region of interest (collectively "relevant objects"). In at least some examples, limiting perception system metrics to only those objects which are relevant to the vehicle (e.g., which may impact a trajectory of the vehicle), the tool may provide greater insight into the safety of such a system. As a non-limiting example, it is more relevant to safety determinations to determine that the system consistently tracks an object in a trajectory of the vehicle, as opposed to a relative percentage of detections in general. The tool may thus be used to monitor the performance of the vehicle perception system in specified areas and with respect to relevant objects when used offline, thereby ensuring safe operation of the vehicle. Additionally, the tool may provide a means by which deficiencies in the vehicle perception system may be quickly identified (e.g., performance metrics below a threshold level) and rectified, thereby improving the overall safety of vehicle operations. Similarly, when used online (e.g., when the vehicle is moving), such a system may allow a vehicle computing system to dedicate more resources to those objects which are more relevant to safe travel of the vehicle.

The tool may receive perception data corresponding to data captured and/or determined by a vehicle perception system. In various examples, the perception data may include sensor data captured by one or more sensors (e.g., cameras, lidar, radar, time of flight, etc.) of the vehicle. In some examples, the perception data may indicate a presence of an object (e.g., entity) detected by the perception system and/or a classification of the object as an object type (e.g., car, pedestrian, cyclist, animal, building, tree, road surface, curb, sidewalk, unknown, etc. The tool may receive perception data associated with all detected objects within a detected range (e.g., 200 m, 250 m, 275 m, etc.) of the vehicle.

The tool may be configured to determine perception system metrics associated with a defined region of interest based in part on the perception data. In various examples, the tool may determine the perception system metrics by comparing the perception data to a ground truth corresponding to the perception data. The ground truth may represent a verified (e.g., labeled) representation of an environment and/or objects detected therein based on received sensor data captured by the perception system (e.g., pre-recorded data). In some examples, the tool may determine the ground truth, such as utilizing machine learning techniques. In some examples, another computing system may be configured to determine the ground truth, such as via user inputs (e.g., bounding boxes drawn around objects, object classifications, etc.). The perception system metrics may represent an ability of the perception system (e.g., sensors, programs, detected objects, etc.) to identify and track objects, such as detected objects within the region of interest. In some examples, the perception system metrics may include precision and recall. The precision may include the number of tracks that were tracked accurately versus the total number of tracks across the entire data. The recall may include a percentage of objects that the perception system identified as an object that needed to be tracked. In some examples, the tool may provide precision and/or recall data with or without classification. The recall and precision without classification includes the performance of the perception system identifying and tracking objects accurately regardless of classification of the object. The recall and precision include the performance of the perception system to identify and track objects accurately based on the classification of the object.

The region of interest may include an area proximate a vehicle as defined by a user. The region of interest may represent any shape and/or size. The tool may receive a region of interest input from the user, such as via a user interface. In some examples, such a region of interest may comprise a learned region of interest (e.g., as may be output from a machine learned model based on one or more features such as, but not limited to, speed, geolocation, number of lanes, classes of objects, and the like). The region of interest input may include a distance and/or direction from the vehicle in which the region of interest may extend. In various examples, the region of interest may be defined by a set of control points. In such examples, the control points may each represent a position corresponding to a distance ahead of or behind a vehicle (e.g., vehicle center) and a lateral distance from a centerline associated with vehicle movement (e.g., vehicle trajectory)). In various examples, region of interest input may include the set of control points and/or the distances (ahead of or behind the vehicle and lateral) corresponding to the set of control points.

In various examples, the tool may be configured to determine perception system metrics associated with the perception system within multiple regions of interest. In such examples, the tool may receive two or more region of interest inputs (e.g., two or more regions of interest) from the user. For example, the tool may receive a first input defining a first region of interest associated with pedestrian tracking and a second input defining a second region of interest associated with tracking other vehicles.

In various examples, the tool may be configured to determine perception system metrics associated with one or more objects detected within a defined region of interest. The object(s) may include dynamic objects such as other vehicles (e.g., cars, trucks, motorcycles, mopeds, etc.), pedestrians, bicyclists, or the like. In some examples, the objects may be detected based on sensor data captured by one or more sensors (e.g., cameras, motion detectors, lidar, radar, time of flight, etc.) of the vehicle. In such examples, the sensor(s) may correspond to the perception system of the vehicle. In some examples, the objects may be detected based on sensor data received from remote sensors, such as, for example, sensors associated with another vehicle or sensors mounted in the environment that are configured to share data with the vehicle perception system and/or another component of a vehicle computing system.

In various examples, the user may define a minimum portion of the object to be within the region of interest for the object to be defined as being within the region of interest. In such examples, the user may input, such as via the user interface, the minimum portion. The minimum portion may include a percentage of the total object (e.g., 50%, 25%, 10%, etc.), at least a corner of the object, the center of the object, or the like. In at least some examples where such a tool is used online, such a threshold percentage may be extremely small (e.g., less than 5%) in order to ensure conservative and safe tracking of all relative objects. In some examples, the tool may receive the minimum portion and determine whether objects detected by the perception system are within the region of interest. In such examples, the tool may provide perception system metrics associated to the objects determined to be within the region of interest and may ignore objects determined to be outside the region of interest (e.g., the minimum portion not within the region of interest).

In some examples, the tool may be configured to provide perception system metrics associated with a particular classification (class) or type of object. The classification may include a car, truck (e.g., half-ton, semi-trailer truck, etc.), bus, motorcycle, a scooter, moped, a pedestrian, bicyclist, autonomous vehicle, manned vehicle, or the like. In some examples, the tool may receive a classification input designating one or more particular classes of interest. In such examples, the tool may provide perception system metrics related to the particular class(es) of interest. For example, the tool may receive a classification input designating pedestrians as a class of interest. The tool may provide perception system metrics associated with the identification and tracking of pedestrians within a region of interest.

In various examples, the tool may be configured to provide perception system metrics associated with designated object characteristics. In such examples, the user may input, such as via the user interface, one or more characteristics associated with objects in the region of interest. The characteristics may include a size of the object, a shape of the object, a velocity, range of velocities, a direction of travel, or other characteristics associated with the object operating in the environment. For example, the tool may be configured to provide perception system metrics associated with cars traveling in the same direction as the vehicle and within a seven (7) mile per hour difference in velocity compared to the vehicle velocity.

In various examples, the tool may be configured to provide perception system metrics associated with a particular type of sensor. The sensor type may include camera, lidar, radar, and/or other types of sensors used by the perception system. The user may provide a sensor input, such as via the user interface, indicating that the perception system metrics to be provided are those associated with a particular sensor type. For example, the tool may be configured to provide perception system metrics associated with lidar sensors corresponding to the vehicle.

Once configured, the tool may receive perception data (e.g., sensor data and/or processed sensor data) from the vehicle perception system. As discussed above, the perception data may include sensor data captured by the sensor(s) of the vehicle, such as one or more objects detected in the environment. The perception data may correspond to sensor data captured at an initial time (t=0) and/or throughout a time period (e.g., over a range of times in which the vehicle operates). In various examples, the tool may project the region of interest associated with the vehicle and/or detected objects forward in time to identify relevant objects (e.g., objects within the region of interest or objects with trajectories that will intersect the region of interest at a time).

In various examples, the tool may project the detected objects forward in time utilizing one or more motion filters. A first motion filter may access perception data throughout the time period and may apply actual positions of the objects at corresponding times. In at least some examples, the first motion filter may be utilized in an offline tool (e.g., remote from a vehicle computing system) that has access to perception data captured throughout the time period (e.g., pre-recorded data). In such examples, the offline tool may receive perception data associated with vehicle operation over a time period (e.g., vehicle operation over a span of time) and may be configured to identify objects that are relevant to the vehicle over the time period and determine the perception system metrics associated with relevant objects in a single call.

In some examples, the motion filter(s) may include a second motion filter. The second filter may assume a constant kinematic motion (e.g., velocity, acceleration, yaw rate, etc.) of a detected object in the environment. In various examples, the motion filter(s) may include a third motion filter. The third motion filter may utilize a prediction engine to predict one or more trajectories associated with a detected object. In some examples, the trajectories may be used to project the detected object forward in the environment. In various examples, the prediction engine may predict the trajectories based on rules of the road, learned behaviors, such as using a machine learned model to predict object movement, or the like. In some examples, the prediction engine may predict the one or more trajectories based on a top-down representation of an environment, such as by utilizing the techniques described in U.S. patent application Ser. No. 16/151,607 filed Oct. 4, 2018 and entitled "Trajectory Prediction on Top-Down Scenes," the entire contents of which are incorporated herein by reference. Additionally, or in the alternative, the prediction engine may predict the trajectories utilizing heat maps, tree search methods, and/or temporal logic formulae, such as those described in the U.S. patent application Ser. No. 15/807,521 filed Nov. 8, 2017 and entitled "Probabilistic Heat Maps for Behavior Prediction," the entire contents of which are incorporated herein by reference. In at least one example, the second motion filter and/or the third motion filter may be utilized in an online tool (e.g., on a vehicle computing system while the vehicle is operating) to determine future relevance of detected objects. The online tool may be utilized to identify detected objects in an environment and determine relevance according to user-defined criteria during vehicle operation (e.g., in real-time, near real-time). In some examples, the relevance determination may be utilized by a vehicle computing system to determine an action for the vehicle to take in the environment.

As discussed above, the relevant objects may include those that are within the region of interest at an initial time and/or those that may enter the region of interest at a time in the future. In some examples, the relevant objects may include objects of particular classifications, characteristics, etc. as defined by the user (e.g., tool configuration). In some examples, the user may define the designated time in the future of interest. For example, the user may configure the tool to output data associated with objects that will be relevant to the vehicle two (2) seconds in the future (e.g., from an initial time). In various examples, the tool may determine perception system metrics associated with a particular sensor, as defined by the user. For example, a lidar system may have received an update (e.g., to one or more hardware and/or software components of the lidar system). To monitor the performance of the updated lidar system, the user may request perception system metrics associated with lidar only. As such, the tool may filter out perception data associated with other sensors and may provide perception system metrics corresponding to a perception system ability to identify and track relevant objects utilizing sensor data captured by lidar.

As briefly mentioned above, the tool may be utilized in an offline capacity (e.g., remote from a vehicle computing system). In some examples, the offline tool may have access to perception data associated with a vehicle over a time period (e.g., over a span of time in which the vehicle operated, pre-recorded data). In such examples, the offline tool may be configured to utilize the perception data to identify relevant objects and determine perception system metrics associated with the vehicle perception system. For example, a programmer may update software associated with a vehicle computing system to adjust a way in which the vehicle reacts to bicyclist within seven (7) feet of the vehicle. The programmer may configure the tool to determine perception system metrics associated with bicyclists within a region of interest comprising a seven-foot radius around the vehicle. The programmer may run the tool on the software with perception data captured over a time period to determine whether the software performs as expected.

In the offline capacity, the tool may be used to determine performance of a vehicle perception system according to user-defined characteristics. As such, the tool may be utilized to identify one or more faults in the vehicle perception system in the identification and/or tracking of detected objects. For example, a fault in the vehicle perception system may be detected based on perception data corresponding to user-defined criteria (e.g., region of interest, object classification, object characteristic, sensor type, etc.) being below a threshold level (e.g., amount, percentage, etc.). Traditionally, in control planning for an autonomous vehicle, a vehicle computing system may consider each detected dynamic object in an environment. The vehicle computing system may consider each detected dynamic object in control planning considerations while the vehicle operates in the environment. However, including each detected object in planning considerations (e.g., trajectory determinations, calculations, etc.) can be extremely computationally expensive, particularly when there are numerous objects in an environment which are unlikely to interfere with or otherwise influence operation of the vehicle. In some examples, the vehicle computing systems may make a determination of relevance for each detected object and may plan vehicle movements based on the determination of relevance. However, if a determination of relevance is incorrect, the vehicle computing system may track an object that is not relevant, thereby utilizing additional computing resources, or may not track an object that is relevant, thereby decreasing vehicle safety. By monitoring perception system performance according to user-defined characteristics (e.g., in a particular region of interest, based on a particular class of object, etc.), the tool may ensure maximized computing performance of the vehicle perception system, thereby improving the functioning of the vehicle computing system. Additionally, the tool may improve the safety of operation of the vehicle perception system.

In various examples, the tool may be utilized in an online capacity (e.g., on a vehicle computing system while the vehicle is operating). In such examples, the tool may receive perception data at an initial time and may apply a motion filter (e.g., kinematic motion-based motion filter and/or prediction-based motion filter) to the perception data to identify objects that may be relevant to the vehicle at a time in the future. In some examples, the predicted future relevance of objects may be utilized by a planning component of the vehicle computing system to determine an action for the vehicle to take. For example, the tool may receive perception data associated with an initial time. The perception data may include a detected object 20 meters in front of the vehicle with a velocity of zero (0) miles per hour. The tool may determine that the detected object is not relevant to the vehicle at the initial time but based on a projection of the vehicle and object into the future, the detected object will be relevant to the vehicle at a time in the future (e.g., in 2 seconds, 2.6 seconds, 4 seconds, 8 seconds, etc.). The tool may provide the object relevance data to the planning component and based on the object relevance data, the planning component may cause the vehicle to change lanes to avoid the detected object.

In the online capacity, the tool may provide a means by which the perception system may predict a potential conflict with an object in the environment. The perception system may provide the information to a planning system to enable the planning system to navigate the vehicle away from the potential conflict. As such, the tool may significantly improve the safety of real-time or near real-time vehicle operation.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data).

FIG. 1 is an illustration of an autonomous vehicle 102 (vehicle 102) in an environment 100, wherein an example tool may be configured to determine perception system metrics with regard to a region of interest 104. The region of interest 104 may include a user defined area proximate the vehicle 102 inside which objects 108 may be determined to be relevant to the vehicle 102. In various examples, the user may input, such as via a user interface 106, one or more control points 110 defining the region of interest 104. In such examples, the user may place the control point(s) 110 at various locations relative to the vehicle 102. In at least some examples, such a region of interest may be machine learned based on previously recorded data (which may, for example, comprise a set of control points and distances) and may be based on, for example, speeds, yaw, steering, steering rate, accelerations, and the like.

In various examples, the region of interest 104 may be defined using lateral distances (X) from a centerline associated with the vehicle and a length from a center of the vehicle (Y). In some examples, the region of interest 104 may be defined using lateral distances (X) from a vehicle trajectory 112 and a longitudinal distance (Y) along the vehicle trajectory 112. In the illustrated example, the control point(s) 110 defining the region of interest 104 include pairs of control points at equal X distances (e.g., lateral distance) from the centerline and/or the vehicle trajectory 112, each of the pairs of control points situated at various Y distances (e.g., longitudinal distance) from the center of the vehicle 102 and/or longitudinal distances along the vehicle trajectory 112. For example, a first pair of control points may be situated at (+2.5, +2.3) and (−2.5, +2.3) In such an example, the region of interest 104 may be symmetrical on either side of the vehicle. In other examples, the region of interest 104 may be asymmetrical. In various examples, the user interface may include a means by which a user may input Euclidean distances (X/Y coordinate system) and/or route-centric distances (relative to the vehicle and/or vehicle trajectory, such as an arclength and lateral offset). In various examples, the user interface may be configured to toggle between the Euclidean distances and the route-centric distances.

In the illustrative example, the region of interest 104 extends in front of the vehicle 102 along the vehicle trajectory 112 (e.g., direction of travel). In some examples, the region of interest 104 may extend in a pattern (e.g., circular, ovular, square, rectangular, etc.) around the vehicle 102. In some examples, the region of interest 104 may merely be defined as a distance or range of distances relative to the vehicle (e.g., <10 meters, <20 meters, 20<30 meters, etc.). In some examples, the region of interest 104 may extend in front of, behind, and/or to one or both sides of the vehicle 102, traveling along the vehicle trajectory 112.

The tool may receive perception data from the vehicle computing system and/or one or more other computing systems in the environment 100. The perception data may include data associated with one or more sensors. The sensors may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), or the like. The sensors may be mounted on the vehicle 102, on another vehicle in the environment 100, and/or sensors mounted in the environment 100, such as at a blind intersection to provide additional data to vehicle perception systems that would otherwise be unable to detect objects occluded by the blind intersection. In some examples, the perception data may indicate a presence of an object (e.g., entity) detected by the perception system and/or a classification of the object as an object type (e.g., car, pedestrian, cyclist, animal, building, tree, road surface, curb, sidewalk, unknown, etc. The tool may receive perception data associated with all detected objects within a detected range (e.g., 200 m, 250 m, 275 m, etc.) of the vehicle.

In various examples, the tool may be configured to identify objects 108 that are relevant to the vehicle 102 based on the region of interest 104. In such examples, objects 108 inside the region of interest 104 may be defined as relevant and objects 108 outside the region of interest 104 may be defined as irrelevant. In some examples, an object 108 may be considered to be inside (or outside) the region of interest 104 if the entire object 108 is inside (or outside) the region of interest 104. For example, object 108(4) is illustrated as being entirely outside the region of interest 104. Accordingly, the tool may disregard perception data associated with object 108(4) when determining perception system metrics associated with relevant objects.

Figure 3:
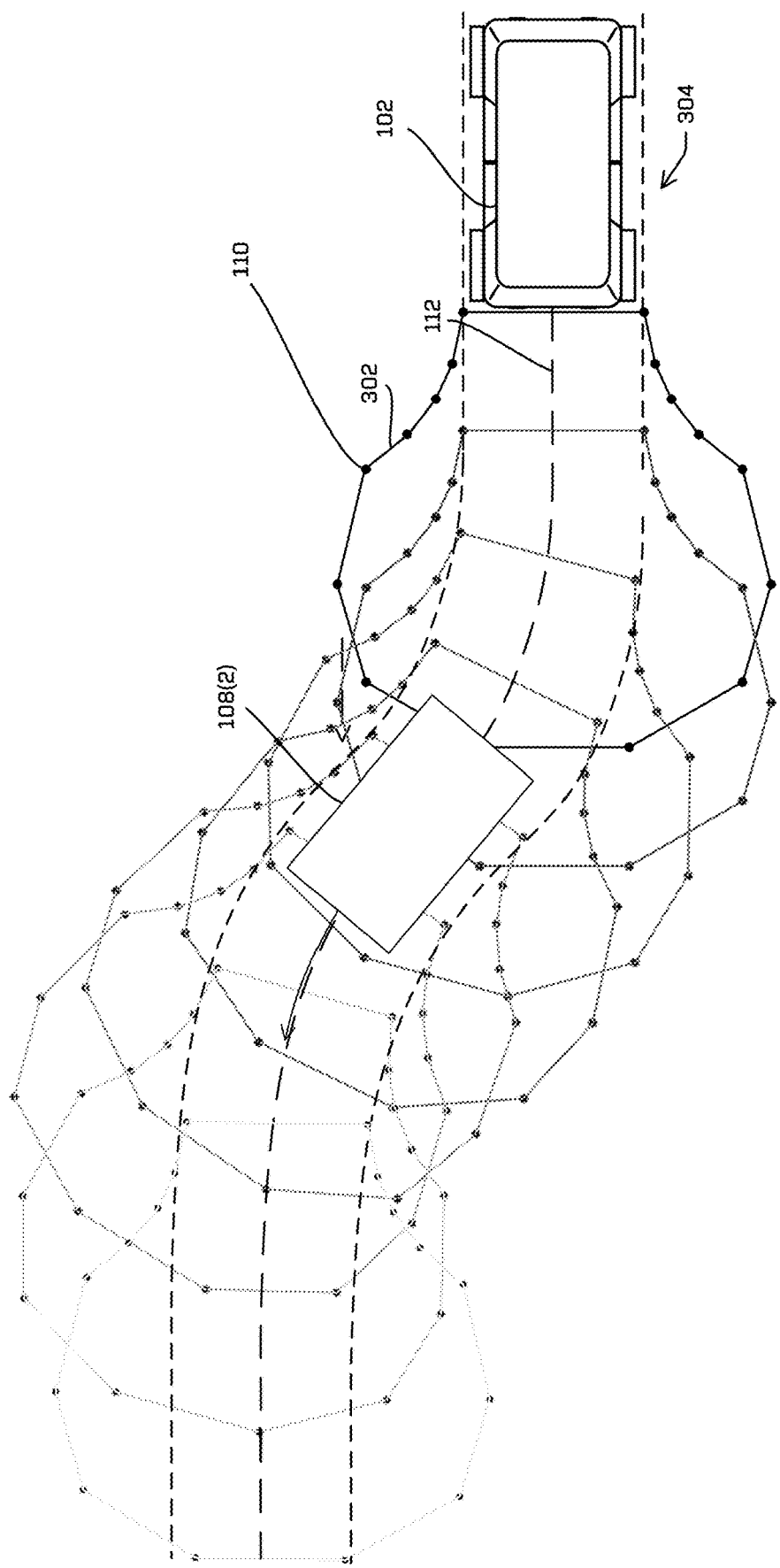
FIG. 3 is an illustration of a route-centric region of interest being projected along a vehicle trajectory.

In various examples, the determination of an object 108 location inside (or outside) the region of interest 104 may be based on one or more locations associated with the object 108. In some examples, the location(s) may correspond to one or more sets of X/Y coordinates relative to the vehicle. In such examples, the set(s) of coordinates may be provided to the tool to determine whether the object 108 is inside or outside the region of interest 104. For example, an object may be located at (3, 6) on an (X, Y) coordinate system relative to the vehicle. The region of interest 104 may extend out to (6, 6) on the same coordinate system. The tool may determine that because the object 108 is located inside the boundary of the region of interest 104 that the object 108 is located inside the region of interest 104. Though described as an X/Y coordinate system, any other coordinate system, such as latitude/longitude, grid system, or other type of coordinate system may be contemplated (e.g., a route/body-centric coordinate system relative to the vehicle as illustrated in FIG. 3, and the like).

In some examples, the object 108 may be considered to be inside the region of interest 104 if a minimum portion of the object 108 is within the region of interest. In some examples, the minimum portion may be defined by the user, such as during tool configuration. In such examples, the tool may receive an input comprising the minimum portion and may apply the minimum portion to the perception system metrics. The minimum portion may include a percentage of the total object (e.g., 50%, 25%, 10%, etc.), at least a corner of the object, the center of the object, or the like. For example, a user may define a minimum portion of the object 108 to be 25%, such that if 25% of the object 108 is within the region of interest, the object 108 is deemed to be relevant to the vehicle 102. The tool may determine that a portion 114 of the object 108(2) that is within the region of interest 104 is greater than the minimum portion of 25%. Accordingly, the tool may determine that the object 108(2) is relevant. For another example, the user may define a minimum portion of an object 108 to include a corner of the object such that if at least one corner of an object 108 is within the region of interest 104, the object 108 is deemed relevant to the vehicle 102. The tool may determine that a corner of object 108(3) is within the region of interest 104 and thus the may determine that the object 108(3) is relevant. For yet another example, the user may define a minimum portion of an object to be a center of the object 108 such that if the center of the object 108 is within the region of interest 104, the object 108 is deemed relevant to the vehicle 102. The tool may determine that the center 116 of the object 108(1) is inside the region of interest 104. Accordingly, the tool may that the object 108(2) is relevant.

In various examples, the tool may determine perception system metrics based on the perception data received from the perception system of the vehicle (e.g., from the vehicle computing system). The perception system metrics may represent an ability of the perception system (e.g., sensors, programs, detected objects, etc.) to identify and track objects, such as detected objects within the region of interest. Such metrics may include, for example, how accurately the system performs detections (e.g., accuracy of bounding box sizes, positions, orientations, etc.), whether any detections were missed or over-included as false positives and false negatives, accuracy of object classifications, and the like. In some examples, the perception system metrics may include precision and recall. The precision may include the number of tracks that were tracked accurately versus the total number of tracks across the entire data. The recall may include a percentage of objects that the perception system identified as an object that needed to be tracked. In some examples, the tool may provide precision and/or recall data with or without classification. The recall and precision without classification includes the performance of the perception system identifying and tracking objects accurately regardless of classification of the object. The recall and precision include the performance of the perception system to identify and track objects accurately based on the classification of the object.

In some examples, the perception system metrics may be determined based on a comparison of the perception data to a ground truth corresponding to the perception data. The ground truth may represent a verified (e.g., labeled) representation of an environment and/or objects detected therein based on received sensor data captured by the perception system (e.g., pre-recorded data). In some examples, the tool may determine the ground truth, such as utilizing machine learning techniques, such as, but not limited to, comparing outputs of detections in differing modalities (e.g., lidar v. camera v. radar, etc.). In some examples, another computing system may be configured to determine the ground truth, such as via user inputs (e.g., bounding boxes drawn around objects, object classifications, etc.). In various examples, the ground truth may include verified objects 108 and/or classifications thereof (e.g., object 108 detection, location, and/or classification verified by a third party, such as a human and/or machine learned computing system). In various examples, the tool may receive the perception data and may filter data corresponding to the objects 108 deemed to be relevant based on the user-defined region of interest 104. The tool may compare the perception data associated with the relevant objects 108 and may compare the relevant object 108 perception data to the ground truth associated with the relevant objects to determine corresponding perception data. In such examples, the tool may be configured to output perception system metrics corresponding to objects 108 within the region of interest 104. In various examples, the tool may be configured to determine perception system metrics associated with a particular classification (class) or type of object. The classification may include a car, truck (e.g., half-ton, semi-trailer truck, etc.), bus, motorcycle, a scooter, moped, a pedestrian, bicyclist, autonomous vehicle, manned vehicle, or the like. In some examples, the tool may receive a classification input designating one or more particular classes of interest. In such examples, the tool may provide perception system metrics related to the particular class(es) of interest. For example, the tool may be configured to provide metrics associated with bicyclists (e.g., bicyclist as a class of interest). The tool may receive perception data associated with the objects 108 in the region of interest 104, such as object 108(1) identified to be a bicycle, object 108(2) identified as a car, object 108(3) identified as a bus. The tool may ignore (e.g., filter out) perception data associated with objects 108(2) and 108(3), providing the perception system metrics associated with object 108(1), the bicycle.

In various examples, the tool may be configured to provide perception system metrics associated with designated characteristics associated with the objects 108. In such examples, the user may input one or more characteristics associated with objects in the region of interest 104. The characteristics may include a size of the object 108, a shape of the object 108, a velocity, range of velocities, a direction of travel, or other characteristics associated with the object operating in the environment. For example, the tool may be configured to provide perception system metrics associated with vehicles (e.g., cars, busses, trucks, etc.) traveling in the same direction as the vehicle and within a ten (10) mile per hour difference in velocity compared to the vehicle velocity. In the user interface 106, the velocity characteristic is illustrated as an object speed +/−10 miles per hour of the vehicle speed (A). The tool may determine that objects 108(2) and 108(3) have associated therewith a velocity within 10 miles per hour of the vehicle 102 and may provide perception system metrics associated therewith as an output. The tool may determine that object 108(1) has a velocity that is 15 miles per hour slower than the vehicle velocity (A) and the tool may ignore (e.g., filter out, exclude) perception metrics data associated with the object 108(1). Similarly, the tool may determine that the object 108(4) is traveling in a different direction from the vehicle 102 and may ignore (e.g., filter out, exclude) perception system metrics associated with the object 108(4).

In various examples, the tool may be configured to provide perception system metrics associated with a particular type of sensor. The sensor type may include camera, lidar, radar, and/or other types of sensors used by the perception system. The user may provide a sensor input, such as via the user interface 106, indicating that the perception system metrics to be provided are those associated with a particular sensor type. For example, the tool may be configured to provide perception system metrics associated with lidar sensors corresponding to the vehicle 102. The tool may thus output lidar perception system metrics describing a performance of the lidar sensors to detect and track relevant objects 108 (e.g., objects 108 within the region of interest 104 and/or of a designated class and/or characteristic).

In various examples, the tool may be configured to determine one or more errors in the perception system based on the filtered perception system metrics (e.g., filtered for relevant objects, user-defined characteristics, etc.). The error(s) may include a degraded performance of the perception system to identify and/or track objects within the region of interest, objects with a particular classification and/or characteristic. In some examples, the error(s) may include a degraded performance of the perception system with regard to a particular sensor and/or type of sensor. In some examples, the error(s) may be determined based on a precision and/or recall (e.g., a particular metric) being below a threshold value.

In various examples, the tool may be utilized in an online capacity (e.g., on a vehicle computing system while the vehicle 102 is operating). In such examples, the tool may receive perception data at an initial time and may apply one or more motion filter(s) to the perception data to identify objects that may be relevant to the vehicle at a time in the future. The motion filter(s) may include a kinematic motion-based filter and a prediction-based motion filter. The kinematic-motion based motion filter may assume a constant kinematic motion (e.g., velocity, acceleration, yaw rate, etc.) of the detected object 108. The kinematic-motion based motion filter may receive the perception data at the initial time ($t_0$) and may determine an initial kinematic motion of the object 108. The kinematic-motion based motion filter may project the object 108 forward in the environment 100 based on an assumption of constant kinematic motion (e.g., initially detected kinematic motion remains unchanged).

In some examples, the motion filter(s) may include a prediction-based motion filter. The prediction-based motion filter may utilize a prediction engine to predict one or more trajectories associated with a detected object. In some examples, the trajectories may be used to project the detected object 108 forward in the environment 100. In various examples, the prediction engine may predict the trajectories based on rules of the road, learned behaviors, such as using a machine learned model to predict object 108, or the like. In some examples, the prediction engine may predict the one or more trajectories based on a top-down representation of an environment 100, heat maps, tree search methods, and/or temporal logic formulae, machine learning techniques, or the like, such as those described in the U.S. Patent Applications incorporated by reference above. The online tool may be utilized to identify detected objects 108 in an environment and determine potential future relevance according to user-defined criteria during vehicle 102 operation (e.g., in real-time, near real-time).

In some examples, the predicted future relevance of objects 108 may be utilized by a planning component of the vehicle computing system to determine an action for the vehicle 102 to take. For example, the tool may receive perception data associated with an initial time ($t_0$). The perception data may include a detected object 108, such as object 108(2), 30 meters in front of the vehicle with a velocity of zero (0) miles per hour. The tool may determine that the detected object 108(2) is not relevant to the vehicle at the initial time ($t_0$) but based on a projection of the vehicle 102 and object 108(2) into the future, the detected object 108(2) will be relevant to the vehicle 102 at a time in the future (e.g., in 2 seconds, 2.6 seconds, 4 seconds, 8 seconds, etc.). The tool may provide the object relevance data to the planning component and based on the object relevance data, the planning component may cause the vehicle 102 to change lanes to avoid the detected object 108(2).

In the online capacity, the tool may provide a means by which the perception system may predict a potential conflict with an object 108 in the environment 100. The perception system may provide the information to a planning system to enable the planning system to navigate the vehicle away from the potential conflict. As such, the tool may significantly improve the safety of real-time or near real-time vehicle operation.

Figure 2:
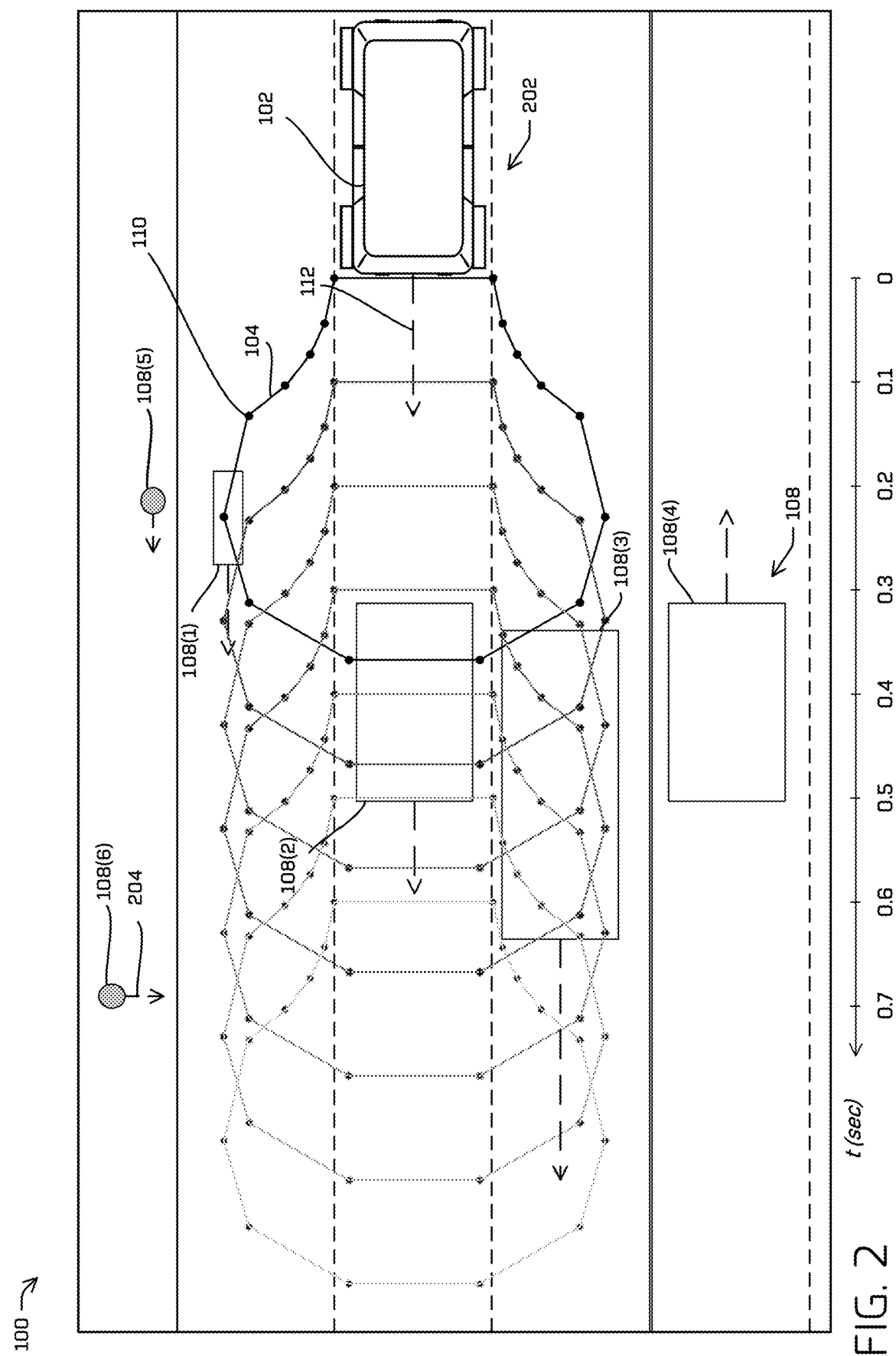
FIG. 2 is an illustration of an autonomous vehicle in an environment, in which an example tool may be used to provide perception data with regard to a region of interest projected along a vehicle trajectory.

FIG. 2 is an illustration of the autonomous vehicle 102 in the environment 100, in which the tool may be used to provide perception system metrics with regard to the region of interest 104 as it is projected along (e.g., associated with) the vehicle trajectory 112 (e.g., velocity, direction of travel, etc.). The vehicle trajectory 112 may correspond to a planned path of the vehicle 102 through the environment 100. Although illustrated as a substantially straight vehicle trajectory 112 (e.g., along a straight, non-curved road), as will be depicted in FIG. 3 below, the vehicle trajectory 112 may include any number of turns along a path and/or route corresponding to the vehicle 102 travel through the environment 100.

In the illustrative example, the region of interest 104 may be projected from a location associated with an initial position 202 of the vehicle along the vehicle trajectory 112 at 0.1 second intervals. In other examples, the region of interest 104 may be projected along the vehicle trajectory 112 at different intervals, such as 0.3 second, 0.5 second, 1 second intervals, etc. In some examples, the tool may project the region of interest 104 according to the direction of travel (e.g., planned path of the vehicle 102). In such examples, the control point(s) 110 associated with the region of interest 104 may maintain a relative position from the center of the vehicle 102 as the vehicle traverses the environment 100, regardless of vehicle 102 maneuvers (e.g., going straight, turning, etc.).

In various examples, the projection of the region of interest 104 may enable the tool to determine whether an object 108 detected in the environment may be relevant to the vehicle 102 at a time in the future (compared to an initial time t=0) and/or over a time period. In such examples, the tool may project the objects 108 forward in time according to one or more motion filters (as described in detail below), such as to determine whether the object 108 may intersect the region of interest 104. For example, the tool may apply a motion filter to an object 108(6) detected in the environment to determine where the object 108(6) will be in future. Based on a determination that the object 108(6) may intersect the region of interest 104 at a time in the future, the tool may determine to include data associated with the object 108(6) in the filtered perception metrics. In some examples, the time period may be a user-defined time period (e.g., 2 seconds, 8 seconds, 10 seconds, etc.) programmed in the tool. In such examples, the tool may be configured to determine object 108 relevance over the user-defined time period and/or provide filtered perception system metrics with regard to the time period.

In various examples, the motion filters may correspond to object movement and/or object trajectory assumptions. A first motion filter (e.g., the complete motion filter) may assume that the tool has access to perception data associated with object 108 movement. In some examples, the perception data may correspond to data captured by one or more sensors during vehicle 102 operation in the environment 100. In such examples, the perception data may include actual locations (e.g., positions) of the objects 108 relative to the vehicle 102 throughout the time period. The tool may determine, based on known positions of the object 108, whether the object is relevant to the vehicle 102 (e.g., intersects the region of interest).

A second motion filter (e.g., the kinematic motion-based motion filter) may assume that the object 108 maintains a constant kinematic motion (e.g., velocity, acceleration, yaw rate, etc.) as it travels through the environment 100. The tool may receive sensor data corresponding to an initial frame (e.g., initial time t=0) and may determine an object trajectory 204 associated with an object 108, such as object 108(6). The tool may assume the object trajectory 204 is constant (e.g., constant acceleration, constant velocity, constant yaw rate, etc.) and may determine, based on the constant object trajectory 204, whether the object 108(6) may intersect the region of interest 104 at a time in the future. In at least one example, the second motion filter may be utilized when the tool receives perception data corresponding to an initial time (t=0). In such an example, the second motion filter may be used to predict future positions of the objects 108 relative to the vehicle 102 to determine whether the objects 108 may intersect the region of interest 104 at a time in the future (e.g., determination of relevance). In various examples, the tool may apply the kinematic motion-based motion filter based upon the roads in the environment 100. In such examples, the tool may detect complicated road structures (e.g., 6-way intersection, etc.) and may apply the kinematic motion-based filter to determine object 108 relevance at the initial time and/or at a time in the future.

A third motion filter (e.g., the prediction-based motion filter) utilizes a prediction engine to predict one or more object trajectories 204 associated with a detected object 108, such as object 108(6). The object trajectories 204 may be used to project the object 108(6) forward in the environment 100 to determine whether the object 108(6) is relevant to the vehicle 102 (e.g., intersects the region of interest 104). In various examples, the prediction engine may predict the trajectories based on rules of the road, learned behaviors, such as using a machine learned model to predict object movement, top-down representations of the environment 100, heat maps, tree search methods, and/or temporal logic formulae, or the like, as described in the U.S. Patent Applications incorporated by reference above. The tool may project the object 108(6) forward in time based on the predicted object trajectories 204 to determine whether the object 108(6) may intersect the region of interest 104 at a time in the future (e.g., determination of relevance).

Based on a determination that the object 108(6) will not intersect the region of interest 104, the tool may determine that the object 108(6) is not relevant to the vehicle 102. Based on a determination of irrelevance, the tool may disregard data associated with the object 108(6) when determining the perception system metrics. The tool may improve the functioning of the computing device associated therewith due to the filtering of data associated with the irrelevant object 108(6), providing additional computing resources for other functions of the computing device, such as determining metrics associated with relevant objects, determining actions for the vehicle to take, and the like. Based on a determination that the object 108(6) will intersect the region of interest 104, the tool may determine that the object 108(6) is relevant to the vehicle 102. Additionally or in the alternative, the tool may determine whether the object classification and/or characteristics correspond to the relevant object characteristics defined by the user (e.g., tool configuration). Based on a determination that the object classification and/or characteristics correspond to the defined relevant object characteristics and that the object 108(6) is relevant to the vehicle 102, the tool may determine perception system metrics associated with the object 108(6).

In various examples, the tool may be utilized in an offline mode. In such an example, the tool may run on a computing device remote from a vehicle computing system associated with the vehicle 102, such as a server computing device. An offline tool may receive perception data associated with the vehicle 102 traveling (or that has previously traveled) in the environment 100 and may be configured to provide filtered perception system metrics, such as in a testing scenario. For example, a perception system may include an update to a way in which the perception system detects and tracks pedestrians in the environment. The tool may be configured to provide perception system metrics related to the identification and tracking of pedestrians, such as object 108(6), within the region of interest 104. The tool may receive perception data and identify object 108(6) as a pedestrian with an object trajectory 204 that intersects the region of interest 104. The tool may filter perception data related to the object 108(6), compare the filtered perception data to relevant ground truth data, and provide perception system metrics associated with the object 108(6) to determine whether the update effectively identifies and tracks the object 108(6).

In various examples, the offline tool may be configured to perform in-depth safety reviews of the perception system to verify that the perception system operates with maximized efficiency and safety. Due to its highly configurable nature, the offline tool may provide a means by which the perception system performance may be evaluated in critical environments, such as to improve a collision avoidance system associated with the vehicle 102. Accordingly, the offline tool may enhance the safety of vehicle 102 operation.

In some examples, the tool may be utilized in an online mode. In such an example, the tool may be run on a vehicle computing system associated with the vehicle 102. The tool may be configured to identify relevant objects 108, such as those that intersect the region of interest 104 and provide the relevant object 108 data to the vehicle computing system to determine an action for the vehicle to take. In various examples, the vehicle computing system may include a pre-programmed tool configured with a defined region of interest 104 and/or particular class(es) and/or characteristic(s) of objects 108. In some examples, the vehicle computing system may receive data associated with a tool configuration from a remote computing device, such as server computing device, during vehicle 102 operation. In such examples, the tool may be dynamically configured.

The online tool may be configured to determine a relevance of objects 108 to the vehicle 102 in the environment 100, such as to assist a vehicle 102 planning system in determining actions to take while operating in the environment. The online tool may thus improve the safety of vehicle 102 operations. In some examples, the online tool may receive sensor data associated with an initial frame (e.g., data captured at an initial time). In various examples, the tool may be configured to provide relevance data associated with an initial time (t=0), based on the tool configuration (e.g., user-defined relevance). In such an example, the tool may identify the relevant objects to the vehicle 102 at the initial time. Based on a determination of relevance, the tool may provide perception system metrics associated with the relevant objects 108, such as objects 108(1), 108(2), 108(3), and 108(6) (e.g., filtering out data associated with irrelevant objects 108(4) and 108(5)).

In some examples, the tool may be configured to determine relevance of objects 108 at a future time (e.g., t=0+2 sec). In some examples, the future time may include a time of interest provided by a user (e.g., input into the tool by a user). The tool may project the region of interest 104 (e.g., the vehicle 102) forward based on the vehicle trajectory 112. The tool may apply a kinematic motion-based motion filter and/or a prediction-based motion filter to the sensor data associated with the initial time to project the detected objects 108 forward in time (e.g., determine potential future positions of the objects 108). In some examples, the tool may identify relevant objects 108 at the future time and may provide an indication of relevance to the vehicle computing system. The vehicle computing system (e.g., planning component) may determine an action to take based on the relevant objects and/or predicted positions associated therewith. In some examples, the action may be based on predicted positions associated with the relevant objects 108 as determined using the prediction motion filter, the constant motion filter, or both.

In some examples, the online tool may be configured to track data associated with a designated relevant object 108. In at least one example, the designated relevant object 108 may include an object 108 that is closest to the vehicle 102 (e.g., closest relevant object 108). In such an example, the online tool may be utilized to enhance safety with respect to the closest relevant object 108. For example, the online tool may be configured to track the closest car in front of the vehicle 102 that also shares a lane with the vehicle 102. The region of interest 104 may include a corridor extending laterally substantially the width of the lane and extending a designated distance in front of the vehicle. In such an example, the tool may determine actions for the vehicle 102 to take based on the perception system tracking a car preceding the vehicle 102 in the lane.

In various examples, the tool may identify irrelevant objects 108 and may provide an indication of irrelevance to the vehicle computing system. The vehicle computing system may process the indication of irrelevance and may remove data associated with the irrelevant object 108 from planning considerations (e.g., control the vehicle at the exclusion of the irrelevant object).

FIG. 3 is an illustration of a route-centric region of interest 302, such as region of interest 104, projected along a vehicle trajectory 112 of a vehicle 102. As discussed above, the region of interest 302 may be defined by a user (or otherwise, e.g., machine learned), such as by a set of control points. In some examples, the user may define the region of interest in a tool configuration. The configuration may include an initial configuration and/or an updated configuration. In various examples, the tool configuration may be updated dynamically, such as when the vehicle is in operation. In such examples, a configuration of an online tool may be adjusted dynamically.

In some examples, the region of interest 302 may be defined by one or more distances and/or direction relative to the vehicle 102. For example, the region of interest 302 may include a circle around the vehicle 102 with a 15-meter radius. For another example, the region of interest 302 may include a semi-circle from a point abeam the vehicle 102 on a right side to a point abeam the vehicle 102 on the left side with a 5-meter radius. For yet another example, the region of interest 302 may include an angle and a radius, such as from 330 degrees relative to a forward-facing portion of the vehicle 102 (e.g., direction of travel) to 030 degrees relative to the forward-facing portion of the vehicle 102 and a radius of 15 feet. For yet another example, the region of interest 302 may include an ovular shape extending 15 feet in front of the vehicle 102 and 5 feet to either side of the vehicle 102.

In at least one example, the region of interest 302 may be defined by a set of control points 110. The set of control points 110 may include pairs of points at distances relative to the vehicle and/or vehicle trajectory 112. The control points 110 may include a positive and a negative lateral distance (left and right distances) from the vehicle trajectory 112. In the illustrated example, a first portion of the pairs of control points 110 (e.g., first five pairs) include progressively larger lateral distances for subsequent pairs of control points, such that the first portion includes a concave shape. As illustrated in FIG. 3, a second portion of the pairs of control points 110 may be configured to create a convex shape. Though illustrated as convex and concave shapes, other shapes and/or sizes of regions of interest 302 may be defined by the pairs of control points. For example, pairs of control points 110 may substantially define a circle around the vehicle 102.

The pairs of control points 110 may include a longitudinal distance along the vehicle trajectory 112. The longitudinal distance may include a positive (in front of the vehicle 102), negative (behind the vehicle 102) or neutral (zero, abeam the vehicle 102) value. In some examples, the longitudinal distance may be determined relative to a center of the vehicle 102. In some examples, the longitudinal distance may be determined relative to a body of the vehicle 102.

In the illustrative example, the region of interest 302 may be projected from a location associated with an initial position 304 of the vehicle 102 along the vehicle trajectory 112. The region of interest 302 may be projected at a constant rate (e.g., every 0.1 second, 0.4 seconds, 1 second, etc.). As illustrated in FIG. 3, the tool may project the region of interest 302 according to the direction of travel (e.g., planned path of the vehicle 102). In such examples, the control point(s) 110 associated with the region of interest 104 may maintain a relative position from the vehicle 102 as the vehicle traverses the environment 100, regardless of vehicle 102 maneuvers (e.g., going straight, turning, etc.).

In various examples, the projection of the region of interest 104 may enable the tool to determine whether an object 108, such as object 108(2) detected in the environment may be relevant to the vehicle 102 at a time in the future (compared to an initial time associated with the initial position 304) and/or over a time period. In such examples, the tool may project the object 108(2) forward in time according to one or more motion filters (as described in detail above), such as to determine whether the object 108(2) may intersect the region of interest 302. Based on a determination that the object 108(2) may intersect the region of interest 302, the tool may identify the object 108(2) as a relevant object. Based on a determination of relevance, an online tool may provide the relevance determination to a planning system of the vehicle 102 to determine an action to take (e.g., slow down, change lanes, etc.). Based on a determination of relevance, an offline tool may determine perception system metrics associated with the perception system performance in identifying and tracking the object 108(2).

Figure 4:
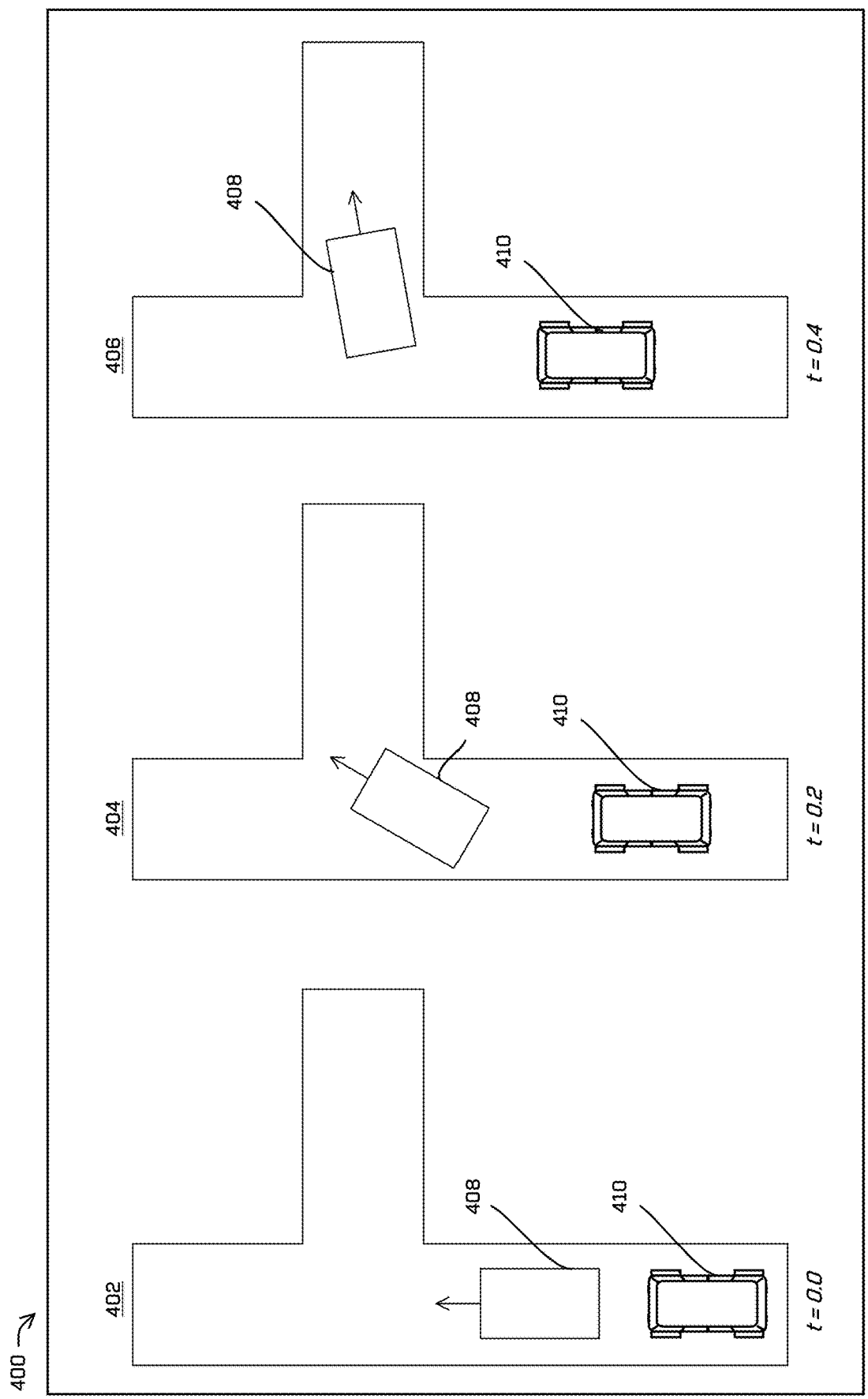
FIG. 4 is an illustration of consecutive frames in which an example motion filter of a tool may project an object forward in time to determine relevance of the object to a vehicle.

FIG. 4 illustrates a first frame 402, a second frame 404, and a third frame 406, in which an example motion filter 400 of a tool projects an object 408, such as object 108, forward in time to determine relevance of the object 408 to a vehicle 410, such as vehicle 102, over time. In the illustrative example, the first frame 402 may correspond to an initial time t=0, the second frame 404 may correspond to a time t=0.2, and the third frame 406 may correspond to a time t=0.4. In other examples, the first frame 402, the second frame 404, and the third frame 406 may correspond to different time intervals, such as consecutive frames being 0.1 second apart, 0.3 seconds apart, or the like.

In various examples, the tool may receive pre-recorded perception data from a vehicle computing system (e.g., captured at a previous time). The perception data may include data associated with the object 408 detected in an environment in which the vehicle operates. In various examples, the perception data may include data captured by one or more sensors over a period of time. The period of time may include a time of vehicle 410 operation or a portion thereof.

The motion filter 400 may utilize the perception data to determine a location of the object 408 relative to the vehicle at the times associated with the first frame 402, the second frame 404, and the third frame 406, illustrated as t=0, t=0.2, and t=0.4, respectively. For example, the motion filter 400 may access the sensor data to determine a location of the object 408 at an initial time (t=0) associated with the first frame 402.

The motion filter 400 may project the object 408 forward in each frame 402, 404, and 406 to determine relevance to the vehicle 410 at each frame. For example, the motion filter 400 may project the object 408 forward to the third frame 406 and determine that, based at least in part on the completed right turn performed by the object 408, that the object 408 will no longer be relevant to the vehicle 102 after the third frame 406 (after t=0.4).

At least because the tool may have access to the relative location of the object 408 to the vehicle 410 in each frame 402, 404, and 406, the motion filter 400 may be configured to identify one or more relevant objects 408 to the vehicle 410 throughout the vehicle operation in a single call. For example, the motion filter 400 may evaluate each frame 402, 404, and 406 to identify objects that are relevant to the vehicle 410 according to the criteria established by the user in the tool (e.g., based on tool configuration). As discussed above, the tool may utilize the relevance determination to filter data and determine perception system metrics associated with the relevant object 408. In various examples, the first motion filter 400 may include an optimal motion filter utilized by an offline tool for determining the performance of the perception system.

Figure 5:
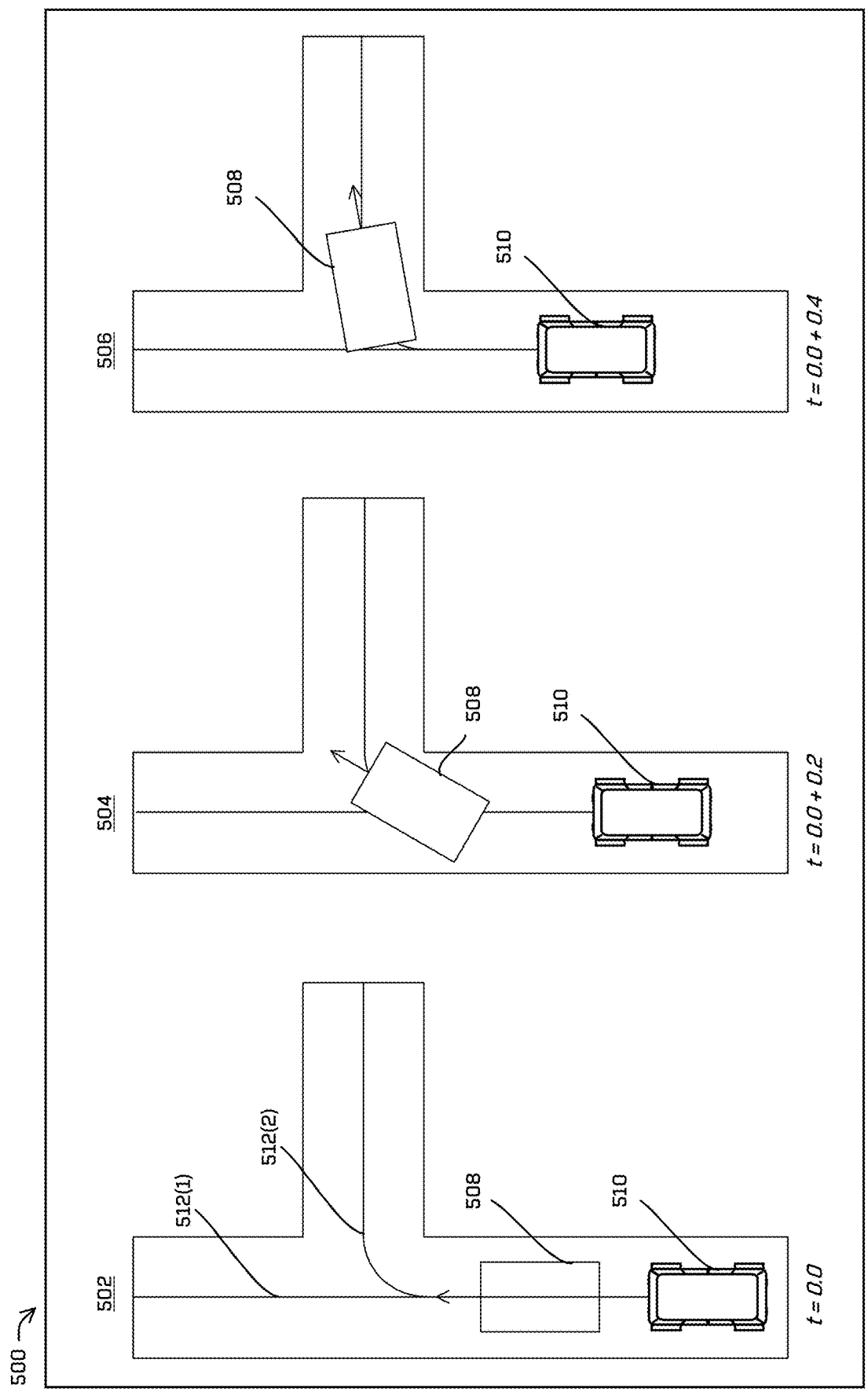
FIG. 5 is an illustration of consecutive frames in which an example motion filter of a tool may project an object forward in time utilizing a prediction engine.

FIG. 5 is an illustration of a first frame 502, a second frame 504, and a third frame 506 in which an example motion filter 500 of a tool projects an object 508, such as object 108, forward in time utilizing a prediction engine. The motion filter 500 may include a prediction-based motion filter. In various examples, the tool may receive perception data corresponding to an initial time (e.g., the first frame 502 at time t=0). The tool may feed the perception data associated with the first frame 502 (e.g., initial frame) into a prediction engine to predict one or more object trajectories associated with a detected object 508. The prediction engine may predict the one or more object trajectories utilizing a top-down representation of the environment, heat maps, tree search methods, temporal logic formulae, and/or machine learning techniques, such as those described in the U.S. Patent Applications incorporated by reference above. The one or more object trajectories may correspond to possible paths 512(1) and 512(2) the object 508 may travel through the environment. The object trajectories may be used to project the object forward in the environment to determine whether the object 508 is relevant to the vehicle 102 at a particular time and/or over a period of time.

In various examples, the prediction engine may predict the trajectories based on rules of the road, learned behaviors, such as using a machine learned model to predict object movement, top-down representations of the environment, heat maps, tree search methods, and/or temporal logic formulae, or the like. The motion filter 500 may project the object 508 forward in time based on the predicted object trajectories to determine whether the object 508 may be relevant to the vehicle 510 at a time in the future (e.g., determination of relevance). In the illustrative example, the prediction engine may determine that the object 508 is predicted to turn right along the path 512(2).

In at least one example, the motion filter 500 may be utilized in an online tool to identify one or more objects 508 that are relevant to the vehicle 510 and/or will be relevant to the vehicle 510 at a time in the future. In such an example, the online tool may be configured to assist a vehicle planning system in determining an action to take, such as to avoid the relevant object 508. For example, at the third frame 506, the vehicle planning system may determine to adjust a position of the vehicle 510 to a left side of the lane in order to increase an amount of space between the object 508 turning around the corner and the vehicle 510 continuing straight.

Figure 6:
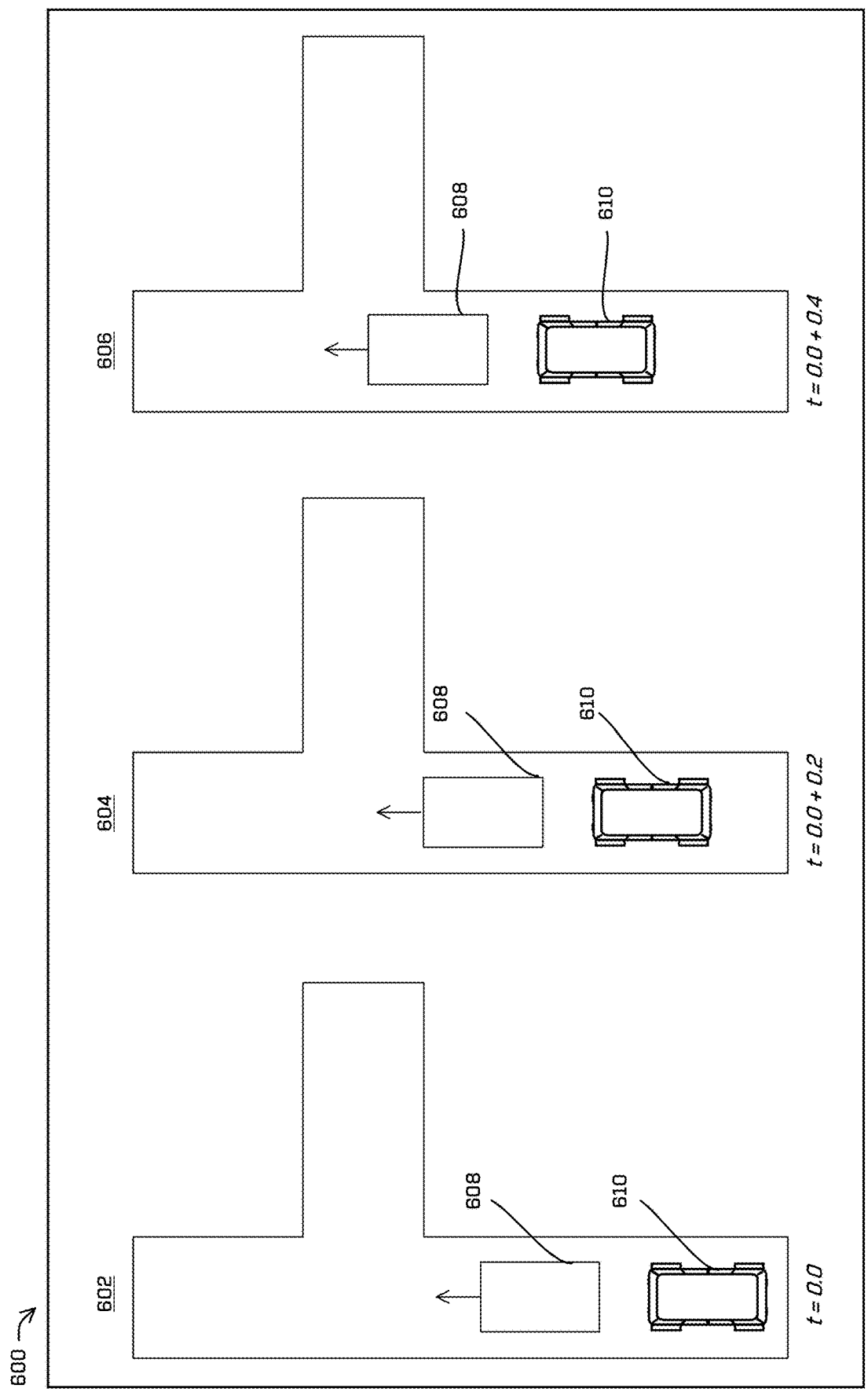
FIG. 6 is an illustration of consecutive frames in which an example motion filter of a tool may project an object forward in time based on an assumption of constant kinematic motion of the object.

FIG. 6 is an illustration of a first frame 602, a second frame 604, and a third frame 606 in which an example motion filter 600 of a tool projects an object 608, such as object 108, forward in time based on an assumption that the object 608 travels with constant kinematic motion (e.g., kinematic motion-based motion filter).

The tool may receive perception data corresponding to an initial time (e.g., the first frame 602 at time t=0). The tool may identify the object 608 and may determine an initial trajectory associated therewith. The trajectory may include kinematic motion for the object 608. The kinematic motion may include a velocity, acceleration, direction, yaw rate, or the like. The motion filter 600 may project the object 608 forward in the environment assuming that the object 608 maintains a constant trajectory (e.g., a constant kinematic motion). The motion filter 600 may determine, based on the projection of the object 608 according to the constant trajectory, whether the object 608 is relevant to the vehicle 610 at particular time (e.g., at the second frame corresponding to a time t=0+0.2) and/or over a range of times (e.g., in 2 seconds (t=0+2 seconds)).

In at least one example, the motion filter 600 may be utilized in an online tool to identify one or more objects 608 that are relevant to the vehicle 610 and/or will be relevant to the vehicle 610 at a time in the future. In such an example, the online tool may be configured to assist a vehicle planning system in determining an action to take, such as to avoid the relevant object 608. Additionally, and as discussed above, the motion filter 600 may be applied to initial perception data by an offline tool in complex road scenarios (e.g., 5-way intersection, 7-way intersection, etc.).

Figure 7:
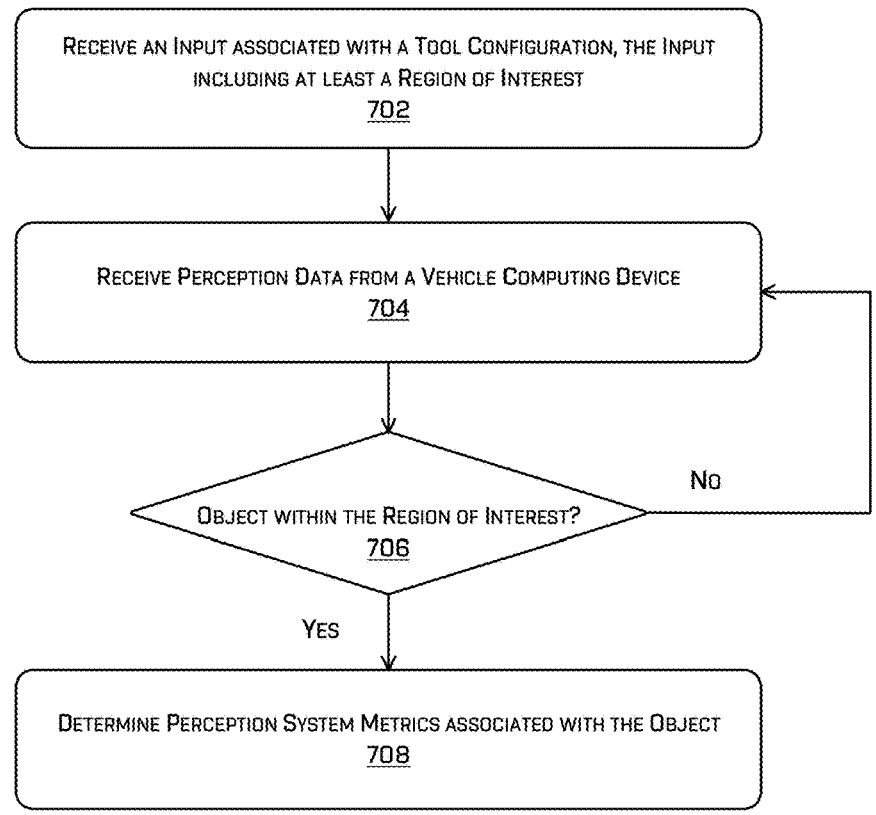
FIG. 7 depicts an example process for determining performance metrics associated with an object detected within a region of interest.
Figure 8:
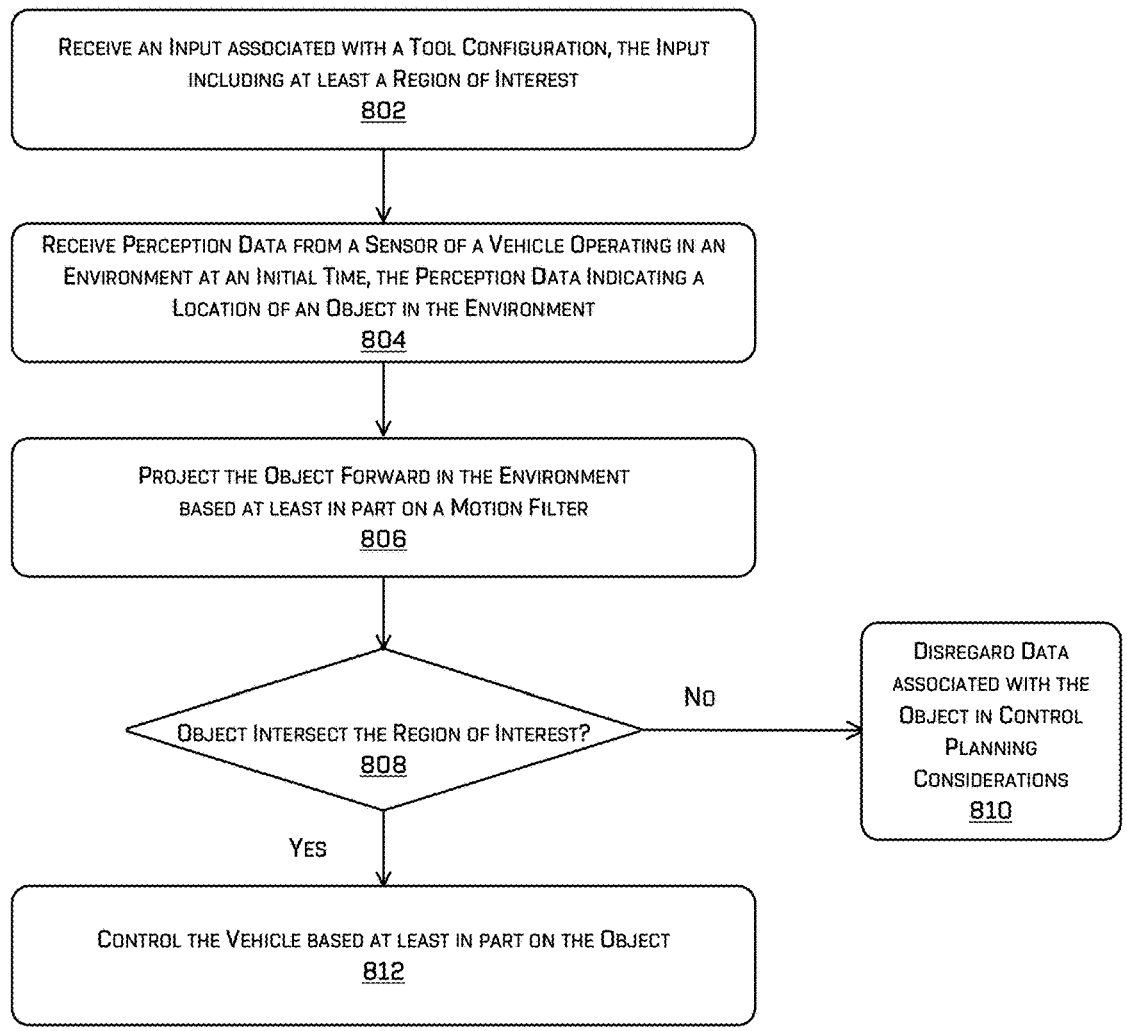
FIG. 8 depicts an example process for identifying relevant objects to a vehicle operating in an environment.

FIGS. 7 and 8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 7 depicts an example process 700 for providing perception system metrics associated with an object detected within a region of interest. Some or all of the process 700 may be performed by one or more components in FIG. 9, as described herein. For example, some or all of the process 700 may be performed by a relevance determination component 930 of the vehicle computing device(s) 904 and/or a relevance determination component 938 of the one or more computing device 934.

At operation 702, the process may include receiving an input associated with a tool configuration, the input including at least a region of interest. The input may be received from a user, such as during configuration of the tool. In various examples, the input may include one or more user-defined criteria of relevance (e.g., a relevance criterion) for filtering perception system metrics.

The region of interest may include a user defined area proximate a vehicle inside which objects may be determined to be relevant to the vehicle. In various examples, the user may input, such as via a user interface, one or more control points defining the region of interest. In such examples, the user may place the control point(s) at various locations relative to the vehicle. In some examples, such a region of interest may comprise a learned region of interest (e.g., as may be output from a machine learned model based on one or more features such as, but not limited to, speed, geolocation, number of lanes, classes of objects, and the like).

In various examples, the region of interest may be defined using lateral distances from a centerline associated with the vehicle (e.g., vehicle trajectory) and a longitudinal distance from a point of the vehicle. The point of the vehicle may include a center (e.g., center of mass) of the vehicle or a point associated with a body of the vehicle. In some examples, the input may include pairs of control points at equal lateral distances from the centerline, each of the pairs of control points situated at various longitudinal distances from the point of the vehicle. For example, a first pair of control points may be situated at (+3.5, +3.3) and (−3.5, +3.3) and a second pair of control points may be situated at (+3.5, +6.0) and (−3.5, +6.0). In such an example, the region of interest may be symmetrical on either side of the vehicle. In other examples, the region of interest may be asymmetrical.

In some example, the region of interest may extend in front of the vehicle along direction of travel (e.g., vehicle trajectory). In some examples, the region of interest may extend in a pattern (e.g., circular, ovular, square, rectangular, etc.) around the vehicle. In some examples, the region of interest may be defined as a distance or range of distances relative to the vehicle (e.g., <10 meters, <20 meters, 20<30 meters, etc.). In some examples, the region of interest may extend in front of, behind, and/or to one or both sides of the vehicle, traveling along the vehicle trajectory.

In various examples, the input may further include a classification, one or more object characteristics, a particular sensor or sensor type of interest, and the like. The classification may include a car, truck (e.g., half-ton, semi-trailer truck, etc.), bus, motorcycle, a scooter, moped, a pedestrian, bicyclist, autonomous vehicle, manned vehicle, or the like. In some examples, the tool may receive a classification input designating one or more particular classes of interest. In such examples, the tool may provide perception system metrics related to the particular class(es) of interest. The object characteristics may include a velocity, range of velocities, a direction of travel, or other characteristics associated with the object operating in the environment. The particular sensor of interest may include a requirement of the tool to provide performance data corresponding to a particular type of sensor of the perception system (e.g., lidar, radar, camera, etc.).

At operation 704, the process may include receiving perception data from a vehicle computing device. The perception data may include data captured by one or more sensors of the vehicle and/or one or more remote sensors. The sensors may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), or the like. In some examples, a portion of the perception data may be received from one or more computing devices, such as from the vehicle computing device associated with the vehicle, a vehicle computing device associated with another vehicle, and/or a computing device associated with a sensor mounted in the environment.

At operation 706, the process may include determining whether an object is within the region of interest. An object may be within the region of interest if the object or a portion thereof is within a boundary of the region of interest (e.g., within the confines of the region of interest). As discussed above, the tool may determine whether a detected object is within the region of interest based on a user-defined definition of what constitutes being inside the region of interest. The user-defined definition may include a center of the object being within the region of interest, a minimum percentage of the object being within the region of interest, a corner and/or other portion of the object being within the region of interest, or the like.

In various examples, the tool may project the vehicle and detected objects forward in the environment to determine whether an object may intersect the region of interest (e.g., may be relevant to the vehicle) at a time in the future. The vehicle may be projected based on the vehicle trajectory. The tool may apply one or more motion filters to the object to determine locations (e.g., positions) of the object at times in the future. As described above with respect to at least FIGS. 4-6, the motion filters may include a complete motion filter, a prediction motion filter, and a constant motion filter. Based on a determination that a detected object may intersect the region of interest at a time in the future, the detected object may be determined to be relevant to the vehicle.

Based on a determination that the object is not within the region of interest at an initial time or will not intersect the region of interest at a time in the future ("No" at operation 706), the process may include receiving perception data from the vehicle computing device, such as that described with regard to operation 704.

Based on a determination that an object within the region of interest at an initial time or may intersect the region of interest at a time in the future ("Yes" at operation 706), at operation 708, the process may include determine performance metrics associated with the object (e.g., filter perception data associated with the object and determine metrics associated therewith). In some examples, the tool may provide the perception system metrics associated with the relevant object to the user via a metrics report. In various examples, the data captured in the metrics report (e.g., data associated with the relevant object) may be utilized by the server computing device to evaluate the performance of the perception system in particular areas and/or with regard to particular objects and/or sensors. In some examples, the data may be used to ensure the perception system performance is optimized, thereby ensuring optimum vehicle safety. In some examples, the data may be used to identify areas for improvement in the perception system, thereby improving the safety of the vehicle operation.

FIG. 8 depicts an example process 800 for identifying relevant objects to a vehicle operating in an environment. Some or all of the process 800 may be performed by one or more components in FIG. 9, as described herein. For example, some or all of the process 800 may be performed by a relevance determination component 930 of the vehicle computing device(s) 904 and/or a relevance determination component 938 of the computing device(s) 934.

At operation 802, the process may include receiving an input associated with a tool configuration, the input including at least a region of interest. The input may be received from a user, such as during configuration of the tool. In various examples, the input may include one or more user-defined criteria of relevance (e.g., a relevance criterion) for filtering perception system metrics. In some examples, the input may be received during vehicle operation. In such examples, the tool may be configured dynamically. In various examples, the region of interest may be machine learned based on previously recorded data (which may, for example, comprise a set of control points and/or distances) and may be based on, for example, speeds, yaw, steering, steering rate, accelerations, and the like.

The region of interest may include a user defined area proximate a vehicle inside which objects may be determined to be relevant to the vehicle. In various examples, the user may input, such as via a user interface, one or more control points defining the region of interest. In such examples, the user may place the control point(s) at various locations relative to the vehicle. In some examples, the user may input one or more lateral and/or longitudinal distances associated with the region of interest. In some examples, the user may input a distance and angle relative to the vehicle defining the region of interest (e.g., pie shape, semi-circle, etc.).

In various examples, the region of interest may be defined using lateral distances from a centerline associated with the vehicle (e.g., vehicle trajectory) and a longitudinal distance from a point of the vehicle. The point may include a center of the vehicle, a center point on a body of the vehicle, or the like. In some examples, the input may include pairs of control points at equal lateral distances from the centerline, each of the pairs of control points situated at various longitudinal distances from the center of the vehicle. For example, a first pair of control points may be situated at (+3.5, +3.3) and (−3.5, +3.3) and a second pair of control points may be situated at (+3.5, +6.0) and (−3.5, +6.0). In such an example, the region of interest may be symmetrical on either side of the vehicle. In other examples, the region of interest may be asymmetrical.

In some example, the region of interest may extend in front of the vehicle along direction of travel (e.g., vehicle trajectory). In some examples, the region of interest may extend in a pattern (e.g., circular, ovular, square, rectangular, etc.) around the vehicle. In some examples, the region of interest may be defined as a distance or range of distances relative to the vehicle (e.g., <10 meters, <20 meters, 20<30 meters, etc.). In some examples, the region of interest may extend in front of, behind, and/or to one or both sides of the vehicle, traveling along the vehicle trajectory.

In various examples, the input may further include a classification, one or more object characteristics, a particular sensor or sensor type of interest, and the like. The classification may include a car, truck (e.g., half-ton, semi-trailer truck, etc.), bus, motorcycle, a scooter, moped, a pedestrian, bicyclist, autonomous vehicle, manned vehicle, or the like. In some examples, the tool may receive a classification input designating one or more particular classes of interest. In such examples, the tool may be configured to identify objects associated with the particular class(es) as relevant. The object characteristics may include a velocity, range of velocities, a direction of travel, or other characteristics associated with the object operating in the environment. The particular sensor of interest may include a requirement of the tool to identify relevant objects utilizing data corresponding to a particular type of sensor of the perception system (e.g., lidar, radar, camera, etc.).

At operation 804, the process may include receiving perception data from a sensor of a vehicle operating in an environment at an initial time, the perception data indicating a location of an object in the environment. The perception data may represent a position, orientation and/or brief historical data associated with of the object and/or other objects in the environment at the initial time as captured by the sensor. The sensor may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), or the like.

At operation 806, the process may include projecting the object forward in the environment based at least in part on a motion filter. The motion filter may include a prediction-based motion filter, and/or a kinematic motion-based motion filter. The kinematic motion-based motion filter may assume constant kinematic motion (e.g., velocity, acceleration, direction, yaw rate, etc.) of a detected object in the environment. The prediction-based motion filter may utilize a prediction engine to predict one or more trajectories associated with a detected object. In some examples, the trajectories may be used to project the detected object forward in the environment. In various examples, the prediction engine may predict the trajectories based on rules of the road, learned behaviors, such as using a machine learned model to predict object movement, top-down representations of the environment, heat maps, tree search methods, and/or temporal logic formulae, such as those described in the U.S. Patent Application incorporated by reference above.

At operation 808, the process may include determining whether an object intersects the region of interest. An object may intersect the region of interest if the object or a portion thereof is within a boundary of the region of interest (e.g., within the confines of the region of interest). As discussed above, the tool may determine whether the object intersects the region of interest based on a user-defined definition of what constitutes intersecting (e.g., being within) the region of interest. The user-defined definition may include a center of the object being within the region of interest, a minimum percentage of the object being within the region of interest, a corner and/or other portion of the object being within the region of interest, or the like.

The tool may determine whether the object intersects the region of interest by projecting the region of interest forward in time based on the vehicle trajectory associated with a planned path of the vehicle and determining whether the object, as projected forward utilizing the motion filter, intersects the region of interest at a time in the future. Based on a determination that the object may intersect the region of interest at a time in the future, the object may be determined to be relevant to the vehicle.

Based on a determination that the object does not intersect the region of interest ("No" at operation 808), at operation 810, the process may include disregarding data associated with the object in control planning considerations. As such, the techniques described herein may improve the functioning of the vehicle computing system by reducing a computational load required by the vehicle in determining actions to take, increasing processing power and/or memory available for other vehicle computing system functions.

Based on a determination that an object intersects the region of interest ("Yes" at operation 808), at operation 812, the process may include controlling the vehicle based at least in part on the object. In various examples, the tool may provide data associated with the relevant object (e.g., object that intersects the region of interest) to a planning component of the vehicle computing device. The planning component may determine one or more actions (e.g., speed up, slow down, change lanes, adjust a position in a lane, etc.) to take based on the relevant object.

Figure 9:
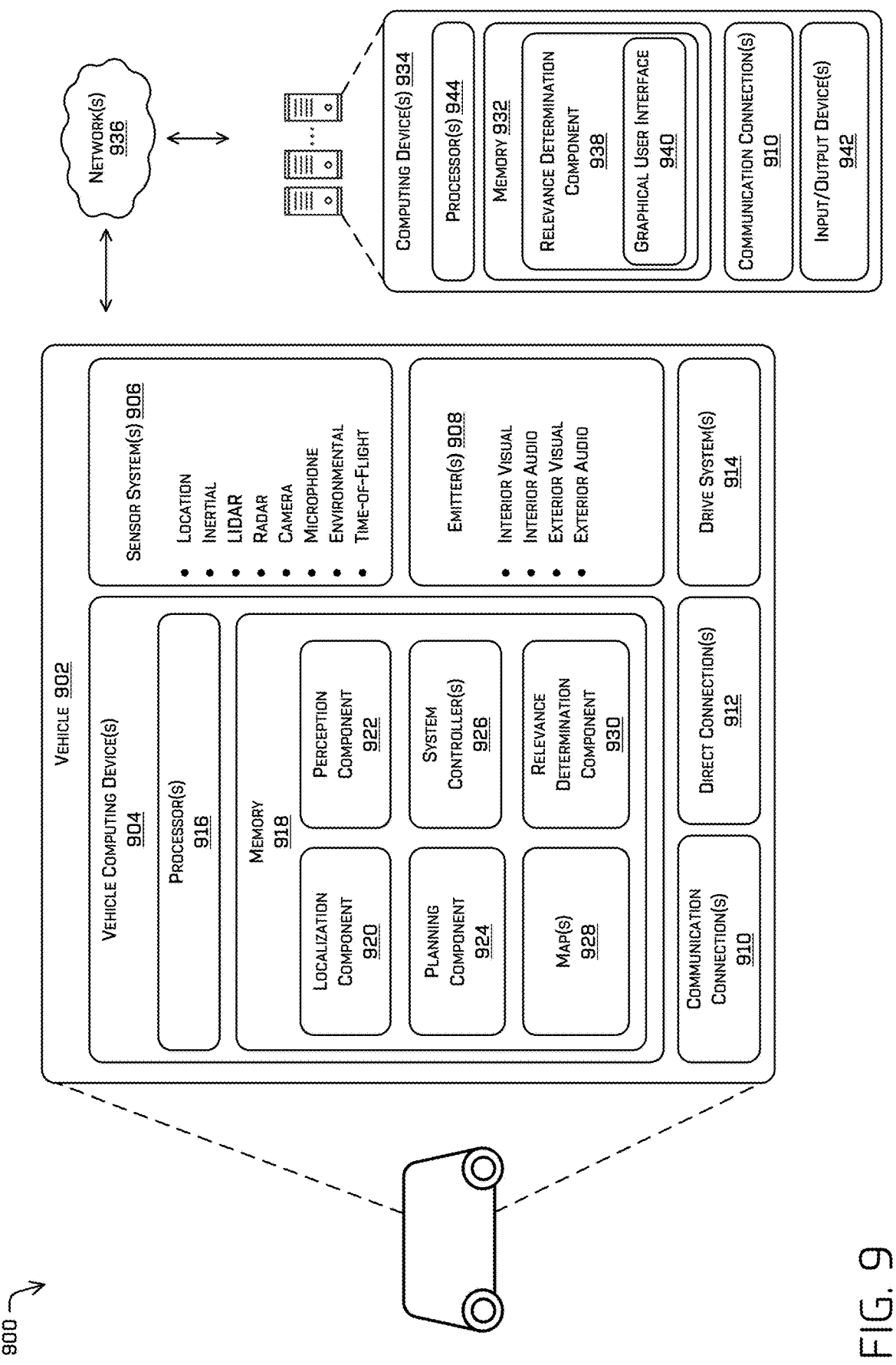
FIG. 9 is a block diagram of an example system for implementing the techniques described herein.

FIG. 9 is a block diagram of an example system 900 for implementing the techniques described herein. In at least one example, the system 900 may include a vehicle 902, such as vehicle 102.

The vehicle 902 may include one or more vehicle computing devices 904, one or more sensor systems 906, one or more emitters 908, one or more communication connections 910, at least one direct connection 912, and one or more drive systems 914.

The vehicle computing device(s) 904 may include one or more processors 916 and memory 918 communicatively coupled with the one or more processors 916. In the illustrated example, the vehicle 902 is an autonomous vehicle; however, the vehicle 902 could be any other type of vehicle, such as a semi-autonomous vehicle, or any other system having at least an image capture device (e.g., a camera enabled smartphone). In the illustrated example, the memory 918 of the vehicle computing device(s) 904 stores a localization component 920, a perception component 922, a planning component 924, one or more system controllers 926, one or more maps 928, and a relevance determination component 930. Though depicted in FIG. 9 as residing in the memory 918 for illustrative purposes, it is contemplated that the localization component 920, a perception component 922, a planning component 924, one or more system controllers 926, one or more maps 928, and a relevance determination component 930 may additionally, or alternatively, be accessible to the vehicle 902 (e.g., stored on, or otherwise accessible by, memory remote from the vehicle 902, such as, for example, on memory 932 of one or more remote computing devices 934). Additionally, although illustrated as a separate component, the relevance determination component 930 may be a part of and/or the functions thereof as described herein, may be performed by the perception component 922 and/or the planning component 924.

In at least one example, the localization component 920 may include functionality to receive data from the sensor system(s) 906 to determine a position and/or orientation of the vehicle 902 (e.g., one or more of an x-, y-, z-position, roll, pitch, or yaw). For example, the localization component 920 may include and/or request/receive a map of an environment, such as from map(s) 928, and may continuously determine a location and/or orientation of the autonomous vehicle within the map. In various examples, the map(s) 928 may include road segments identifications (e.g., numbers, etc.) associated with various portions of the roads on the map(s). In some examples, the road segment identifications may be associated with a road network managed at least in part by the computing device(s) 934. In some instances, the localization component 920 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 920 may provide data to various components of the vehicle 902 to determine an initial position of an autonomous vehicle for determining whether an object is relevant to the vehicle 902, as discussed herein.

In some instances, the perception component 922 may include functionality to perform object detection, segmentation, and/or classification. In some examples, the perception component 922 may provide processed sensor data (e.g., perception data) that indicates a presence of an object (e.g., entity) that is proximate to the vehicle 902 and/or a classification of the object as an object type (e.g., car, pedestrian, cyclist, animal, building, tree, road surface, curb, sidewalk, unknown, etc.). In some examples, the perception component 922 may provide processed sensor data that indicates a presence of a stationary entity that is proximate to the vehicle 902 and/or a classification of the stationary entity as a type (e.g., building, tree, road surface, curb, sidewalk, unknown, etc.). In additional or alternative examples, the perception component 922 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position, e.g., height), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a zone associated with the environment (e.g., school zone, business district, etc.), a time of day, a day of a week, a season, a weather condition, an indication of darkness/light, etc.

In general, the planning component 924 may determine a path for the vehicle 902 to follow to traverse through an environment. For example, the planning component 924 may determine various routes and trajectories and various levels of detail. For example, the planning component 924 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 924 may generate an instruction for guiding the autonomous vehicle 902 along at least a portion of the route from the first location to the second location. In at least one example, the planning component 924 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 902 to navigate.

In various examples, the planning component 924 may receive relevant object data from the relevance determination component 930. The relevant object data may include a determination that one or more objects in the environment are relevant to the vehicle 902. In such examples, the planning component 924 may determine one or more actions to take (e.g., change velocity, adjust a position in a lane, change lanes, etc.) and/or one or more trajectories associated with the action based on the relevant object data.

In some examples, the planning component 924 may include a prediction component to generate predicted trajectories of objects (e.g., objects) in an environment. For example, a prediction component may generate one or more predicted trajectories for objects within a threshold distance from the vehicle 902. In some examples, the predicted trajectories may include any number of potential paths in which a detected object may travel from a current position (e.g., at the time of perception) and/or based on a direction of travel. In some examples, the predicted trajectories may represent a distance and direction in which the object will travel over a period of time. In some examples, a prediction component may measure a trace of an object and generate a trajectory for the object based on observed and predicted behavior. In various examples, the prediction component may determine predicted trajectories based on one or more of machine learning techniques, top-down representation techniques, heat maps, temporal logic, and/or tree search methods. In various examples, the planning component 924 may receive a predicted trajectory from the metrics component, such as based on a motion filter applied to data associated with the object at an initial position. In some examples, the relevance determination component 930 may utilize the prediction component (e.g., a prediction engine thereof) to predict an object trajectory, such as that predicted utilizing the prediction motion filter.

In at least one example, the vehicle computing device(s) 904 may include one or more system controllers 926, which may be configured to control steering, propulsion, braking, safety, emitters, communication, and other systems of the vehicle 902. The system controller(s) 926 may communicate with and/or control corresponding systems of the drive system(s) 914 and/or other components of the vehicle 902.

The memory 918 may further include one or more maps 928 that may be used by the vehicle 902 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 902 may be controlled based at least in part on the map(s) 928. That is, the map(s) 928 may be used in connection with the localization component 920, the perception component 922, and/or the planning component 924 to determine a location of the vehicle 902, detect objects in an environment, generate routes, determine actions and/or trajectories to navigate within an environment.

In some examples, the one or more maps 928 may be stored on one or more computing device(s) 934, accessible via network(s) 936. In some examples, multiple maps 928 may be stored based on, for example, a characteristic (e.g., type of entity, time of day, day of week, season of the year, etc.). Storing multiple maps 928 may have similar memory requirements, but increase the speed at which data in a map may be accessed.

As illustrated in FIG. 9, the vehicle computing device(s) 904 may include a relevance determination component 930. The relevance determination component 930 may be configured to determine whether one or more objects, such as objects 108 of FIG. 1, are or may be relevant to the vehicle 902. In various examples, the relevance determination component 930 may be configured according to one or more machine learned models. In some examples, the relevance determination component 930 may be configured according to one or more user-defined criteria. As discussed above, the user-defined criteria may include a region of interest, object classification, object characteristic, sensor type, or the like. In various examples, the region of interest may include one or more control points defining a lateral and/or longitudinal distance from a vehicle. In such examples, the lateral distance may include a lateral distance left and/or right from a trajectory of the vehicle. In some examples, the region of interest may be machine learned based on previously recorded data (which may, for example, comprise a set of control points and distances) and may be based on, for example, speeds, yaw, steering, steering rate, accelerations, and the like.

In various examples, the relevance determination component 930 may be configured prior to deployment of the vehicle 902. In some examples, the relevance determination component 930 may be dynamically configured, such as by input into a relevance determination component 938 on the computing device(s) 934. In such examples, the relevance determination component 938 may receive the input, such as via a graphical user interface 940, such as graphical user interface 106, and/or via one or more input/output devices 942 and may send the input to the relevance determination component 930 via the network(s) 936.

As described above, an online version of the metrics component, such as relevance determination component 930 may provide object relevance determinations to the planning component 924. The object relevance determinations may be used by the planning component 924 to determine one or more actions for the vehicle 902 to take. An offline version of the metrics component, such as relevance determination component 938, may be configured to filter perception data according to the user-defined criteria to determine perception system metrics describing an ability of the perception system to identify and track objects in the environment. The relevance determination component 938 may receive processed sensor data (e.g., perception data) data from the perception component 922. The relevance determination component 938 may identify relevant objects in the environment based on the sensor data and the relevance determination component 938 configuration (e.g., user-defined criteria, machine learned models, etc.). The relevance determination component 938 may then filter the perception data based on the relevant objects to determine perception metrics associated with the relevant objects.

As can be understood, the components discussed herein (e.g., the localization component 920, the perception component 922, the planning component 924, the one or more system controller(s) 926, the one or more maps 928, the relevance determination component 930 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 918 (and the memory 932, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 906 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 906 may include multiple instances of each of these or other types of sensors. For instance, the lidar sensors may include individual lidar sensors located at the corners, front, back, sides, and/or top of the vehicle 902. As another example, the camera sensors may include multiple cameras disposed at various locations about the exterior and/or interior of the vehicle 902. The sensor system(s) 906 may provide input to the vehicle computing device(s) 904. Additionally or in the alternative, the sensor system(s) 906 may send sensor data, via the one or more networks 936, to the computing device(s) 934 at a particular frequency, after a lapse of a predetermined period of time, in near real-time, etc.

The vehicle 902 may also include one or more emitters 908 for emitting light and/or sound. The emitter(s) 908 may include interior audio and visual emitters to communicate with passengers of the vehicle 902. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 908 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 and/or the computing device(s) 934 may also include one or more communication connection(s) 910 that enable communication between the vehicle 902 and/or the computing device(s) 934 and one or more other local or remote computing device(s). For example, the communication connection(s) 910 may facilitate communication with other local computing device(s) on the vehicle 902 and/or the drive system(s) 914. For another example, the communication connection(s) 910 may facilitate communication between the vehicle 902 and the computing device(s) 934, such as to communicate tool data (e.g., configuration data) between the relevance determination component 938 and the relevance determination component 930.

The communications connection(s) 910 may include physical and/or logical interfaces for connecting the vehicle computing device(s) 904 to another computing device or a network, such as network(s) 936. For example, the communications connection(s) 910 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 902 may include one or more drive systems 914. In some examples, the vehicle 902 may have a single drive system 914. In at least one example, if the vehicle 902 has multiple drive systems 914, individual drive system(s) 914 may be positioned on opposite ends of the vehicle 902 (e.g., the front and the rear, etc.). In at least one example, the drive system(s) 914 may include one or more sensor systems to detect conditions of the drive system(s) 914 and/or the surroundings of the vehicle 902. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 914. In some cases, the sensor system(s) on the drive system(s) 914 may overlap or supplement corresponding systems of the vehicle 902 (e.g., sensor system(s) 906).

The drive system(s) 914 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 may include a drive system controller which may receive and preprocess data from the sensor system(s) and to control operation of the various vehicle systems. In some examples, the drive system controller may include one or more processors and memory communicatively coupled with the one or more processors. The memory may store one or more systems to perform various functionalities of the drive system(s) 914. Furthermore, the drive system(s) 914 may also include one or more communication connection(s) that enable communication by the respective drive system with one or more other local or remote computing device(s).

In at least one example, the direct connection 912 may provide a physical interface to couple the one or more drive system(s) 914 with the body of the vehicle 902. For example, the direct connection 912 may allow the transfer of energy, fluids, air, data, etc. between the drive system(s) 914 and the vehicle. In some instances, the direct connection 912 may further releasably secure the drive system(s) 914 to the body of the vehicle 902.

In at least one example, the localization component 920, the perception component 922, the planning component 924, the one or more system controllers 926, the one or more maps 928, and the relevance determination component 930, may process sensor data, as described above, and may send their respective outputs, over the one or more networks 936, to the computing device(s) 934. In at least one example, the localization component 920, the perception component 922, the planning component 924, the one or more system controllers 926, the one or more maps 928, and the relevance determination component 930 may send their respective outputs to the computing device(s) 934 at a particular frequency, after a lapse of a predetermined period of time, in near real-time, etc.

In some examples, the vehicle 902 may send sensor data (e.g., perception data) to the computing device(s) 934 via the network(s) 936. In some examples, the vehicle 902 may receive sensor data from the computing device(s) 934 and/or one or more remote sensor system(s), via the network(s) 936. The sensor data may include raw sensor data and/or processed sensor data and/or representations of sensor data. In some examples, the sensor data (raw or processed) may be sent and/or received as one or more log files.

The computing device(s) 934 may include one or more processors 944 and a memory 932 storing the relevance determination component 938. The processor(s) 916 of the vehicle 902 and the processor(s) 944 of the computing device(s) 934 may be any suitable processor capable of executing instructions to process data and perform operations as described herein. By way of example and not limitation, the processor(s) 916 and 944 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 918 and 932 are examples of non-transitory computer-readable media. The memory 918 and 932 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 918 and 932 may include at least a working memory and a storage memory. For example, the working memory may be a high-speed memory of limited capacity (e.g., cache memory) that is used for storing data to be operated on by the processor(s) 916 and 944. In some instances, the memory 918 and 932 may include a storage memory that may be a lower-speed memory of relatively large capacity that is used for long-term storage of data. In some cases, the processor(s) 916 and 944 cannot operate directly on data that is stored in the storage memory, and data may need to be loaded into a working memory for performing operations based on the data, as discussed herein.

It should be noted that while FIG. 9 is illustrated as a distributed system, in alternative examples, components of the vehicle 902 may be associated with the computing device(s) 934 and/or components of the computing device(s) 934 may be associated with the vehicle 902. That is, the vehicle 902 may perform one or more of the functions associated with the computing device(s) 934, and vice versa.

EXAMPLE CLAUSES

A: A system comprising: one or more processors; and memory storing instructions executable by the one or more processors, wherein the instructions program the one or more processors to: determine a vehicle trajectory associated with a vehicle, the vehicle trajectory indicative of a path and velocity associated with the vehicle; receive, as a region of interest associated with the vehicle, a set of control points comprising values indicating a lateral distance from the vehicle trajectory and a longitudinal distance along the vehicle trajectory; receive sensor data from a sensor of the vehicle; determine, based at least in part on the sensor data and by a perception system associated with the vehicle, an object in the environment; determine an object trajectory associated with the object; determine an intersection between the object trajectory and the region of interest; and identify the object as a relevant object.

B: The system as paragraph A describes, wherein sensor data comprises previously recorded sensor data, wherein the object is one of a plurality of objects in the environment, and wherein the instructions further program the one or more processors to: one or more of determine or receive a set of metrics associated with the plurality of objects in the environment; determine, based at least in part on identifying the object as relevant, a subset of the set of metrics associated with the object; and output the subset of metrics.

C: The system as paragraph A or B describes, wherein the input is a first input and wherein the instructions further configure the vehicle to: receive a second input associated with an object characteristic; and determine that the object is associated with the object characteristic, wherein identifying the object as the relevant object is based at least in part on determining that the object is associated with the object characteristic.

D: The system as any of paragraphs A-C describe, wherein the instructions further program the one or more processors to one or more of: control the vehicle based at least in part on identifying the object as relevant; or output a metric associated with the object indicative of a characteristic of the perception system.

E: The system as any of paragraphs A-D describe, wherein determining the object trajectory is based at least in part on at least one of: determining, based at least in part on the sensor data, positions of the object at corresponding times; determining prediction data associated with the object; or determining a kinematic motion associated with the object.

F: A method comprising: determine a vehicle trajectory associated with a vehicle, the vehicle trajectory indicative of a path and velocity associated with the vehicle; receiving data representing a region of interest associated with a vehicle, the data including at least one distance representative of a size of the region of interest; receiving perception data associated with a sensor of the vehicle; determining, based at least in part on the perception data, that an object in the environment intersects the region of interest; and identifying the object as a relevant object.

G: The method as paragraph F describe, wherein the data is first data, the method further comprising: receiving second data corresponding to an object characteristic; and determining that the object is associated with the object characteristic, wherein identifying the object as the relevant object is based at least in part on determining that the object is associated with the object characteristic.

H: The method as paragraph G describe, wherein the characteristic comprises at least one of: a size; a classification; or one or more velocities.

I: The method as any of paragraphs F-H describe, further comprising causing the vehicle to be controlled based at least in part on identifying the object as relevant.

J: The method as any of paragraphs F-I describe, wherein determining that the object in the environment intersects the region of interest is based at least in part on at least one of: determining, based at least in part on the perception data, that a position of a plurality of positions of the object is inside the region of interest; determining, based on prediction data associated with the object, that a predicted position of the object is inside the region of interest; or determining, based on a kinematic motion of the object, that the predicted position of the object is inside the region of interest.

K: The method as any of paragraphs F-J describe, wherein the data is first data, the method further comprising: receiving second data comprising a time period of relevance; determining an object trajectory utilizing at least one motion filter; and determining, based on the object trajectory, that the object intersects the region of interest within the time period of relevance, wherein identifying the object as a relevant object is based at least in part on determining that the object intersects the region of interest within the time period of relevance.

L: The method as any of paragraphs F-K describe, further comprising: determining a ground truth associated with the perception data; comparing the perception data to the ground truth; determining perception system metrics associated with the relevant object based on comparing the perception data to the ground truth.

M: The method as any of paragraphs F-L describe, wherein the data comprises: a first pair of control points comprising a first lateral distance from the vehicle and a first length from the vehicle; a second pair of control points comprising a second lateral distance from the vehicle and a second length from the vehicle, wherein the second lateral distance is greater than the first lateral distance and the second length is greater than the first length; a third pair of control points comprising a third lateral distance from the vehicle and a third length from the vehicle, wherein the third lateral distance is greater than the second lateral distance and the third length is greater than the second length; and a fourth pair of control points comprising a fourth lateral distance from the vehicle and a fourth length from the vehicle, wherein the fourth lateral distance is less than the third lateral distance and the fourth length is greater than the third length.

N: The method as any of paragraphs F-M describe, wherein data comprises: a first pair of control points comprising a first lateral distance and a first longitudinal distance from the vehicle trajectory; and a second pair of control points comprising a second lateral distance and a second longitudinal distance from the vehicle trajectory.

O: A system or device configured with one or more processors and one or more computer-readable medium storing instructions that, when executed, cause the one or more processors to perform the method described in any of paragraphs F-N.

P: A non-transitory computer-readable medium storing instructions that, when executed, cause one or more processors to perform operations comprising: determining a vehicle trajectory associated with a vehicle, the vehicle trajectory indicative of a path and velocity associated with the vehicle operating in an environment; receiving data associated with a relevance criterion, wherein the relevance criterion is associated with a relevance of an object to the vehicle operating in the environment; receiving perception data associated with a sensor of the vehicle; determining, based at least in part on the perception data, an object in the environment; determining that the object satisfies the relevance criterion; and identifying the object as a relevant object.

Q: The non-transitory computer-readable medium of paragraph P, wherein the relevance criterion comprises at least one of: a region of interest; an object classification; or an object characteristic.

R: The non-transitory computer-readable medium of paragraph P or Q, wherein the relevance criterion comprises a region of interest and wherein determining that the object satisfies the relevance criterion is based at least in part on: projecting the region of interest along the vehicle trajectory; determining, based at least in part on the perception data, an object trajectory associated with the object; and determining, based at least in part on the object trajectory, an intersection associated with the object and the region of interest.

S: The non-transitory computer-readable medium of any of paragraphs P-R, the operations further comprising: determining a ground truth associated with the perception data; comparing the perception data to the ground truth; and determining perception system metrics associated with the relevant object based on comparing the perception data to the ground truth.

T: The non-transitory computer-readable medium of any of paragraphs P-S, the operations further comprising: controlling the vehicle based at least in part on the relevant object.

U: The non-transitory computer-readable medium of paragraph T, wherein controlling the vehicle comprises causing the vehicle to adjust at least one of: a lane associated with the vehicle; a position within the lane associated with the vehicle; or a velocity of the vehicle While the example clauses described above are described with respect to one particular implementation, it should be understood that, in the context of this document, the content of the example clauses can also be implemented via a method, device, system, computer-readable medium, and/or another implementation. Additionally, any of examples A-U may be implemented alone or in combination with any other one or more of the examples A-U.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   memory storing instructions executable by the one or more processors, wherein the instructions program the one or more processors to:
   determine a vehicle trajectory associated with a vehicle operating in an environment, the vehicle trajectory indicative of a path and velocity associated with the vehicle;
   receive, from a user, a region of interest associated with the vehicle, the region of interest comprising a set of control points comprising values indicating a lateral distance from the vehicle trajectory and a longitudinal distance along the vehicle trajectory;
   receive sensor data from a sensor of the vehicle;
   determine, based at least in part on the sensor data and by a perception system associated with the vehicle, an object in the environment;
   determine an object trajectory associated with the object;
   determine an intersection between the object trajectory and the region of interest; and
   identify the object as a relevant object.

2. The system as claim 1 recites, wherein sensor data comprises previously recorded sensor data,
   wherein the object is one of a plurality of objects in the environment, and
   wherein the instructions further program the one or more processors to:
   one or more of determine or receive a set of metrics associated with the plurality of objects in the environment;
   determine, based at least in part on identifying the object as relevant, a subset of the set of metrics associated with the object; and
   output the subset of the set of metrics.

3. The system as claim 1 recites, wherein the instructions further configure the vehicle to:
   receive an input associated with an object characteristic; and
   determine that the object is associated with the object characteristic,
   wherein identifying the object as the relevant object is based at least in part on determining that the object is associated with the object characteristic.

4. The system as claim 1 recites, wherein the instructions further program the one or more processors to one or more of:
   control the vehicle based at least in part on identifying the object as relevant; or
   output a metric associated with the object indicative of a characteristic of the perception system.

5. The system as claim 1 recites, wherein determining the object trajectory is based at least in part on at least one of:
   determining, based at least in part on the sensor data, positions of the object at corresponding times;
   determining prediction data associated with the object; or
   determining a kinematic motion associated with the object.

6. A method comprising:
   determining a vehicle trajectory associated with a vehicle operating in an environment, the vehicle trajectory indicative of a path and velocity associated with the vehicle;

receiving, from a user, data representing a region of interest associated with the vehicle, the data including a set of control points defining the region of interest;

receiving perception data associated with a sensor of the vehicle;

determining, based at least in part on the perception data, that an object in the environment intersects the region of interest; and identifying the object as a relevant object.

7. The method as claim 6 recites, wherein the data is first data, the method further comprising:

receiving second data corresponding to an object characteristic; and determining that the object is associated with the object characteristic, wherein identifying the object as the relevant object is based at least in part on determining that the object is associated with the object characteristic.

8. The method as claim 7 recites, wherein the object characteristic comprises at least one of:

a size;

a classification; or one or more velocities.

9. The method as claim 6 recites, further comprising causing the vehicle to be controlled based at least in part on identifying the object as relevant.

10. The method as claim 6 recites, wherein determining that the object in the environment intersects the region of interest is based at least in part on at least one of:

determining, based at least in part on the perception data, that a position of a plurality of positions of the object is inside the region of interest;

determining, based on prediction data associated with the object, that a predicted position of the object is inside the region of interest; or determining, based on a kinematic motion of the object, that the predicted position of the object is inside the region of interest.

11. The method as claim 6 recites, wherein the data is first data, the method further comprising:

receiving second data comprising a time period of relevance;

determining an object trajectory utilizing at least one motion filter; and determining, based on the object trajectory, that the object intersects the region of interest within the time period of relevance, wherein identifying the object as a relevant object is based at least in part on determining that the object intersects the region of interest within the time period of relevance.

12. The method as claim 6 recites, further comprising:

determining a ground truth associated with the perception data;

comparing the perception data to the ground truth; and determining perception system metrics associated with the relevant object based on comparing the perception data to the ground truth.

13. The method as claim 6 recites, wherein the data comprises:

a first pair of control points comprising a first lateral distance from the vehicle and a first length from the vehicle;

a second pair of control points comprising a second lateral distance from the vehicle and a second length from the vehicle, wherein the second lateral distance is greater than the first lateral distance and the second length is greater than the first length;

a third pair of control points comprising a third lateral distance from the vehicle and a third length from the vehicle, wherein the third lateral distance is greater than the second lateral distance and the third length is greater than the second length; and a fourth pair of control points comprising a fourth lateral distance from the vehicle and a fourth length from the vehicle, wherein the fourth lateral distance is less than the third lateral distance and the fourth length is greater than the third length.

14. The method as claim 6 recites, wherein the data comprises:

a first pair of control points comprising a first lateral distance and a first longitudinal distance from the vehicle trajectory; and a second pair of control points comprising a second lateral distance and a second longitudinal distance from the vehicle trajectory.

15. A non-transitory computer-readable medium storing instructions that, when executed, cause one or more processors to perform operations comprising:

determining a vehicle trajectory associated with a vehicle, the vehicle trajectory indicative of a path and velocity associated with the vehicle operating in an environment;

receiving, from a user, data associated with a relevance criterion, wherein the relevance criterion comprises a set of control points representing a region of interest that is associated with a relevance of an object to the vehicle operating in the environment;

receiving perception data associated with a sensor of the vehicle;

determining, based at least in part on the perception data, an object in the environment;

determining that the object satisfies the relevance criterion; and identifying the object as a relevant object.

16. The non-transitory computer-readable medium of claim 15, wherein the relevance criterion further comprises at least one of:

an object classification; or an object characteristic.

17. The non-transitory computer-readable medium of claim 15, wherein determining that the object satisfies the relevance criterion is based at least in part on:

projecting the region of interest along the vehicle trajectory;

determining, based at least in part on the perception data, an object trajectory associated with the object; and determining, based at least in part on the object trajectory, an intersection associated with the object and the region of interest.

18. The non-transitory computer-readable medium of claim 15, the operations further comprising:

determining a ground truth associated with the perception data;

comparing the perception data to the ground truth; and determining perception system metrics associated with the relevant object based on comparing the perception data to the ground truth.

19. The non-transitory computer-readable medium of claim 15, the operations further comprising:

controlling the vehicle based at least in part on the relevant object.

20. The non-transitory computer-readable medium of claim 15, wherein the set of control points comprises:
- a first pair of control points comprising a first lateral distance and a first longitudinal distance from the vehicle trajectory; and
- a second pair of control points comprising a second lateral distance and a second longitudinal distance from the vehicle trajectory.

* * * * *